United States Patent
Van Huben et al.

(10) Patent No.: US 6,484,177 B1
(45) Date of Patent: Nov. 19, 2002

(54) DATA MANAGEMENT INTEROPERABILITY METHODS FOR HETEROGENEOUS DIRECTORY STRUCTURES

(75) Inventors: Gary A. Van Huben, Poughkeepsie, NY (US); Joseph L. Mueller, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,719

(22) Filed: Jan. 13, 2000

(51) Int. Cl.$^7$ ............................................. G06F 17/30
(52) U.S. Cl. ................... 707/10; 707/2; 707/4; 707/5
(58) Field of Search ............................. 707/1–10

(56) References Cited

U.S. PATENT DOCUMENTS

| | | | |
|---|---|---|---|
| 5,434,994 A | | 7/1995 | Shaheen et al. |
| 5,689,700 A | | 11/1997 | Miller et al. |
| 5,742,769 A | * | 4/1998 | Lee et al. .................... 707/100 |
| 5,758,343 A | | 5/1998 | Vigil et al. .................... 707/10 |
| 5,812,130 A | * | 9/1998 | Van Huben et al. ............. 707/3 |
| 5,813,006 A | | 9/1998 | Polnerow et al. ............. 707/10 |
| 5,826,265 A | * | 10/1998 | Van Huben et al. ............. 707/8 |
| 5,864,875 A | * | 1/1999 | Van Huben et al. ........ 707/200 |
| 5,878,408 A | * | 3/1999 | Van Huben et al. ............. 707/1 |
| 5,893,107 A | * | 4/1999 | Chan et al. ............. 707/103 R |
| 5,918,227 A | | 6/1999 | Polnerow et al. ............. 707/0 |
| 5,920,867 A | * | 7/1999 | Van Huben et al. ........ 707/101 |
| 5,920,873 A | * | 7/1999 | Van Huben et al. ........ 707/202 |
| 5,930,831 A | | 7/1999 | Marsh et al. ............... 711/173 |
| 5,950,201 A | * | 9/1999 | Van Huben et al. .......... 707/10 |
| 5,966,707 A | * | 10/1999 | Van Huben et al. .......... 707/10 |
| 6,035,297 A | * | 3/2000 | Van Huben et al. ............. 707/8 |
| 6,094,654 A | * | 6/2000 | Van Huben et al. ............. 707/8 |
| 6,088,693 A | * | 7/2000 | Van Huben et al. ............. 707/8 |
| 6,219,700 B1 | * | 4/2001 | Chang et al. ............... 709/222 |
| 6,119,122 A1 | * | 9/2001 | Bunnell ...................... 707/102 |
| 6,327,594 B1 | * | 12/2001 | Van Huben et al. ........ 707/200 |

OTHER PUBLICATIONS www.microsoft.com/wi . . . 000/server/evaluation/features/adlist.asp, Microsoft Windows 2000 Active Directory Features', posted Jun. 15, 1999, pp. 1–5.

* cited by examiner

Primary Examiner—Kim Vu
Assistant Examiner—Anh Ly
(74) Attorney, Agent, or Firm—Lynn L. Augspurger

(57) ABSTRACT

A method for use with a data management system (DMS) enabling a directory service such as the Lightweight Directory Access Protocol (LDAP) and Microsoft's Active Directory to interact with centralized DMS employs a single access application at a user API interface at one or more application layers of the data management system to map transactions for access appropriate to a heterogeneous physical implementation of data storage managed by a virtual control repository used in the DMS. Data objects are classified according to a PFVL Paradigm according to Package, Filetype, Variance and Level as a model for storage of data object in separate DMS storage and directory service storage. Objects in the directory service storage are managed to direct a request in a manner appropriate to the request to a directory service server or if not appropriate to the directory service, to one or more DMS processing managers.

15 Claims, 17 Drawing Sheets

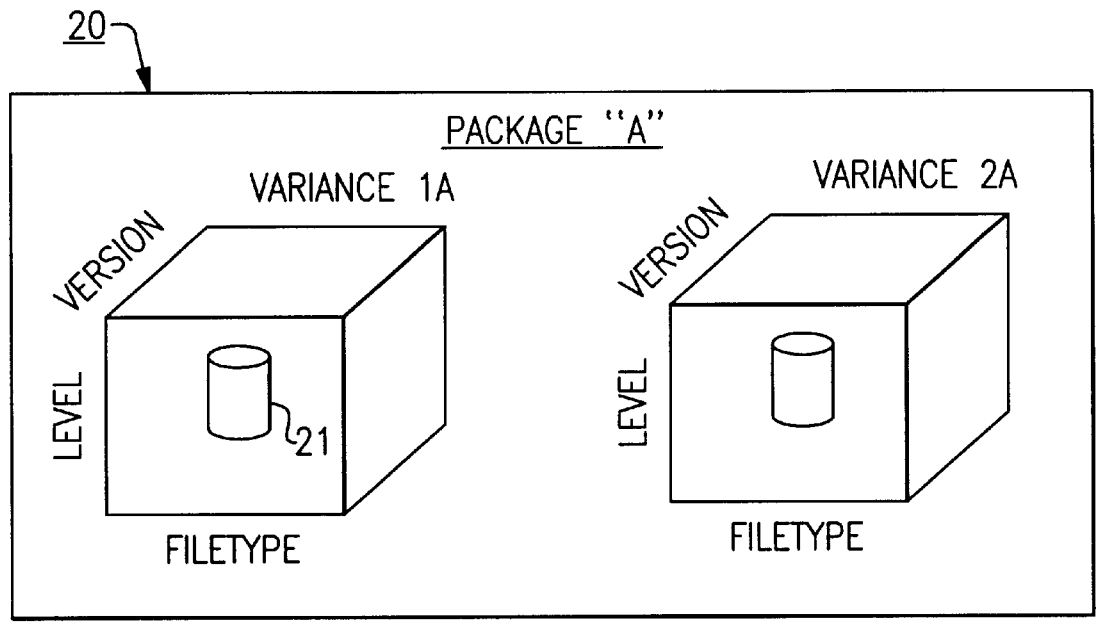
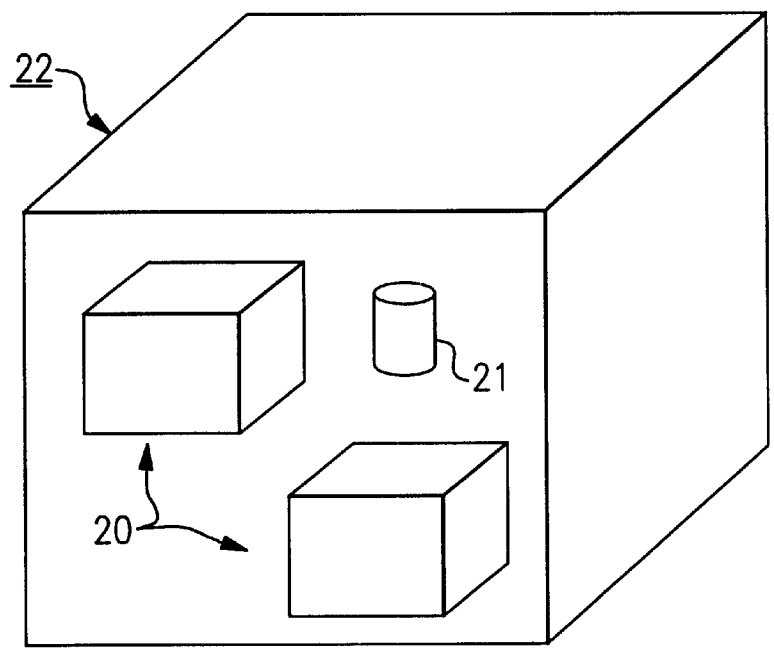
FIG.2A

| FILENAME | FILETYPE | PACKAGE | LEVEL | VARIANCE | VERSION |
|---|---|---|---|---|---|
| MPEG | SCHEM | DSGN_LIB | TEST | USB | 1.23 |
| MPEG | SCHEM | DSGN_LIB | TEST | USB | 1.22 |
| MPEG | SCHEM | DSGN_LIB | PROD | USB | 1.04 |
| MPEG | VHDL | DSGN_LIB | PROD | USB | 2.56 |
| MPEG | LAYOUT | CIRCUITS | REL1 | LOW_VLT | 5 |
| MPEG | SCHEM | DSGN_LIB | PROD | PCI | 2.56 |
| BUS_CTL | SCHEM | DSGN_LIB | PROD | PCI | 3.21 |

23

| FILENAME | FILETYPE | PACKAGE | LEVEL | VARIANCE | VERSION |
|---|---|---|---|---|---|
| H2OPUMP | SCHEM | COOLING | QA1 | BOTH | 13 |
| MICRCTL | SCHEM | COOLING | QA2 | TAURUS | 4 |
| MICRCTL | LAYOUT | COOLING | QA2 | TAURUS | 21 |
| MICRCTL | LAYOUT | COOLING | QA2 | SABLE | 6 |
| FUEL_INJ | SCHEM | ENGINE | QA1 | BOTH | 16 |
| ROM | UCODE | ENGINE | QA2 | SABLE | 34 |
| ENGINE | SCHEM | ELEMECH | QA2 | SABLE | 26 |

O=SONY                  // ORGANIZATION NAME: SONY
OU=CONSUMER ELECTRONICS // ORGANIZATIONAL UNIT: CONSUMER ELECTRONICS (PACKAGE)
PL=TELEVISIONS          // PRODUCT LINE: TELEVISIONS (PACKAGE)
VARIANCE=110V           // VARIANCE: 110VAC U.S. VARIANTS (VARIANCE)
TYPE=HTML               // TYPE: STATIC HTML PAGE (FILETYPE)
LEVEL=CURRENT_MODELS    // LEVEL: CURRENT_MODELS (LEVEL)
MODEL=xl32g34           // MODEL: 32" STEREO COLOR TV (ENTRY NAME)

52

| MODEL | LEVEL | VARIANCE | PART # | SIZE | COLOR | MSRP | QUANTITY |
|---|---|---|---|---|---|---|---|
| xl32g34 | CURRENT_MODELS | 110V | 26F437 | 32 INCH | BLACK | 849.00 | 10427 |
| xl27g15 | CURRENT_MODELS | 110V | 76G327 | 27 INCH | BLACK | 525.00 | 32743 |
| xl27g15 | CURRENT_MODELS | 220V | 76G327 | 27 INCH | BLACK | 525.00 | 9734 |
| tx32120 | 1998_MODELS | 110V | 87F983 | 32 INCH | SILVER | 750.00 | 4903 |
| tx27115 | 1998_MODELS | 110V | 74J899 | 27 INCH | BLACK | 499.00 | 6543 |

FIG.5

OBJECT CLASS DEFINITIONS

OBJECTCLASS INDUSTRY
   REQUIRES
      OBJECTCLASS
      C
      O
      OU
      SECTOR   — 61

OBJECTCLASS SECTOR
   REQUIRES
      OBJECTCLASS
      C
      O
      OU
      CN   — 62

OBJECTCLASS APPLIANCE
   REQUIRES
      OBJECTCLASS
      C
      O
      OU
      PARTNO
      PL
      LEVEL
      VAR
      MODEL
      SIZE
      COLOR
      SPEC
      FILETYPE
   ALLOWS
      MSRP   — 63

FIG. 6A

ATTRIBUTE DEFINITIONS — 64

| | | |
|---|---|---|
| ATTRIBUTE | C | CES |
| ATTRIBUTE | O | CES |
| ATTRIBUTE | OU | CES |
| ATTRIBUTE | CN | CN |
| ATTRIBUTE | SECTOR | CN |
| ATTRIBUTE | PL | CIS |
| ATTRIBUTE | LEVEL | CIS |
| ATTRIBUTE | VAR | CIS |
| ATTRIBUTE | MODEL | CIS |
| ATTRIBUTE | FILETYPE | CIS |
| ATTRIBUTE | PARTNO | CIS |
| ATTRIBUTE | SIZE | CIS |
| ATTRIBUTE | COLOR | CIS |
| ATTRIBUTE | SPEC | CES |
| ATTRIBUTE | MSRP | CIS |

FIG. 6B

LDAP CONTROL REPOSITORY WITH PFVL PARADIGM

DN: OU="CONSUMER ELECTRONICS", O=SONY, C=US
C: US
O: SONY
OU: "CONSUMER ELECTRONICS"
SECTOR: CN="AUDIO PRODUCTS",OU="CONSUMER ELECTRONICS", O=SONY, C=US
SECTOR: CN="TELEVISIONS",OU="CONSUMER ELECTRONICS", O=SONY, C=US
SECTOR: CN="PERSONAL COMPUTERS",OU="CONSUMER ELECTRONICS", O=SONY, C=US
OBJECTCLASS: INDUSTRY

DN: OU="TECHNOLOGY", O=SONY, C=US
C: US
O: SONY
OU: TECHNOLOGY
SECTOR: ???
OBJECTCLASS: INDUSTRY

⎫
⎬ —65
⎭

DN: CN="AUDIO PRODUCTS",OU="CONSUMER ELECTRONICS", O=SONY, C=US
C: US
O: SONY
OU: "CONSUMER ELECTRONICS"
CN: "AUDIO PRODUCTS"
OBJECTCLASS: SECTOR

DN: CN="TELEVISIONS",OU="CONSUMER ELECTRONICS", O=SONY, C=US
C: US
O: SONY
OU: "CONSUMER ELECTRONICS"
CN: "TELEVISIONS"
OBJECTCLASS: SECTOR

LDAP CONTROL REPOSITORY WITH PFVL PARADIGM
(CONT.)

DN: PARTNO=26F434, OU="CONSUMER ELECTRONICS", O=SONY, C=US
C: US
O: SONY
OU: "CONSUMER ELECTRONICS"
PARTNO: 26F434
PL: TV
LEVEL: "CURRENT MODELS"
VAR: 110V
MODEL: xl32g34
SIZE: 32
COLOR: BLACK
SPEC: "HTTP://SPECS.SONY.US.COM/xl32g34.HTML"
FILETYPE: HTML
OBJECTCLASS: APPLIANCE

DN: PARTNO=76G327, OU="CONSUMER ELECTRONICS", O=SONY, C=US
C: US
O: SONY
OU: "CONSUMER ELECTRONICS"
PARTNO: 76G327
PL: TV
LEVEL: "CURRENT MODELS"
VAR: 110V
MODEL: xl27g13
SIZE: 27
COLOR: BLACK
SPEC: "HTTP://SPECS.SONY.US.COM/xl27g13.HTML"
FILETYPE: HTML
OBJECTCLASS: APPLIANCE

```
#INCLUDE <STDIO.H>
#INCLUDE <LDAP.H>
MAIN()
{
  LAP *ID;
  LDAPMESSAGE*RESULT *E;
  CHAR **VALS;
  CHAR *ATTRS[2];
  INT I;
  /* GET HANDLE TO AN LDAP CONNECTION */
  IF ((ID=LDAP_INIT("LDAP.POK.IBM.COM".LDAP_PORT)) == NULL) {
     PERROR("LDAP_INIT");
     RETURN(1);
  }
  /* AUTHENTICATE TO THE DIRECTORY AS NOBODY */
  IF (LDAP_SIMPLE_BIND_S(ID,NULL,NULL) = LDAP_SUCCESS) {
     LDAP_PERROR(ID, "LDAP_SIMPLE_BIND_S");
     RETURN(1);
  }
  /* RETRIEVE IMAGE URL FOR PARTICULAR MODEL */
  ATTRS[0]="SPEC";
  ATTRS[1]=NULL;
  IF (LDAP_SEARCH_S(ID,"CN=TELEVISIONS, OU="CONSUMER ELECTRONICS", O=SONY, C=US",
        LDAP_SCOPE_BASE,
        "(OBJECTCLASS=APPLIANCE,MODEL=xl32g34,TYPE=JPG,LEVEL=CURRENT_MODELS)",
        ATTRS,0, &RESULT)
       !=LDAP_SUCCESS) {
    LDAP_PERROR(ID, "LDAP_SEARCH_S");
    RETURN(1);
  }
/* RETRIEVE THE RESULT */
  IF ((E=LDAP_FIRST_ENTRY(ID,RESULT))!=NULL {
     IF ((VALS=LDAP_GET_VALUES(ID,E,"SPEC")) != NULL){
        /* INSERT CODE TO PROCESS THE URL FOUND IN VALS */
        LDAP_VALUE_FREE(VALS);
     }
  }

LDAP_MSGFREE(RESULT);
  LDAP_UNBIND(ID);
  RETURN(0);
}
```
⎬78

FIG.7B

| PACKAGE | FILETYPE | VARIANCE | LEVEL | FILENAME | USERID |
|---|---|---|---|---|---|
| SALES | WKS | * | YE_1998 | 1Q99 | JANEDOE |
| APPAREL | HTML | ONLINE | FALL_CAT | * | AD_DEPT |
| APPAREL | DB2 | * | FALL_CAT | * | BUYER |
| * | * | * | * | * | DM_ADMIN |

88

| PACKAGE | FILETYPE | VARIANCE | LEVEL | FILENAME | LOCKTYPE | USERID |
|---|---|---|---|---|---|---|
| SALES | WKS | NONE | YE_1998 | 1Q99 | UPDATE | JANEDOE |
| APPAREL | HTML | ONLINE | FALL_CAT | * | OVERLAY | AD_DEPT |
| APPAREL | DB2 | BASE | FALL_CAT | WOMENS | UPDATE | BUYER |
| APPAREL | DB2 | BASE | FALL_CAT | TEENS | UPDATE | BUYER |
| FINANCE | BUDGET | NONE | PROPOSAL | 1998 | UPDATE | CFO |

DATA MANAGEMENT INTEROPERABILITY METHODS FOR HETEROGENEOUS DIRECTORY STRUCTURES

FIELD OF THE INVENTION

This invention is related to the management of objects residing in one or more directory services. These services utilize a common access method which permits the data in the directory services to be managed using a single virtual Data Management System (DMS) based on a modular, scalable architecture. The directory services disclosed herein are those found in typical corporate, enterprise and e-business environments where elements of the Data Management System may exist on a homogenous computer platform or they may be dispersed among a plurality of platforms in a distributed computing environment. The interaction between said directory services and the Data Management System is accomplished through a plurality of commonly available communication protocols which permit a uniform data access and distribution across a heterogeneous network.

BACKGROUND OF THE INVENTION

As the complexity of networks grow, it becomes increasingly more difficult to exchange and manage data, especially in networks comprising a plurality of heterogenous components. Directory services in particular have become such an integral part of corporate networks and the Internet, that methods for expanding their scaleability, improving performance and accessing data are critical to the success of the core business. Compounding the problem is the fact that directory services were initially designed to house information about the network infrastructure such as login access, passwords, network resources, etc. With the inception of the Lightweight Directory Access Protocol (LDAP), corporations began using directory services to maintain organizational data such as names, job responsibilities, telephone numbers, etc. Eventually, e-business and e-commerce matured to the point where directory services are now used to manage many of the elements required to support corporate intranets and web sites. However, directory services tend to be deficient in the area of data and application management, usually lacking fundamental aspects such as revision control, configuration management, release control, lock management, etc.

Our invention seeks to improve upon the present art which addresses these areas by providing a uniform means for managing any type of data across a large global enterprise. The methods disclosed herein can be directly applied to data residing in a directory service, a simple file system or a traditional database. The improvements over the present art can best be illustrated by way of comparison.

For example, U.S. Pat. No. 5,918,227 and U.S. Pat. No. 5,813,006, issued to Polnerow, et al., disclosed an on-line directory service with a plurality of databases and processors. While these inventions propose a method for accessing and registering data from and to one or more databases through the use of a directory service, they're primarily focused on using a plurality of processors to route requests through the directory service in an efficient manner. They also employs a means for applications to reconfigure themselves in accordance with any changes to the processors and/or databases.

Uniform data access among multiple directory services is the main aspect of U.S. Pat. No. 5,893,107, issued to Chan, et al. This invention provides a directory service system for accessing a plurality of directory services. In this class-based directory service system, there exists a means for defining classes and properties to manage the objects contained within the directory services, even if the directory services are from different vendors. It also comprises a schema and methods for retrieving property names and types of the object classes, resolving name conflicts that can arise from accessing objects residing in different directory services and bridging dissimilar APIs associated with heterogengeous directory services.

U.S. Pat. No. 5,689,700, issued to Miller, et al., teaches a method wherein a common logical structure is used to store both the files residing in a file system as well as the directory entries comprising a directory service. This approach permits directory service entries across multiple domains to be managed in a centralized fashion. Also, since the directory service entries are objects, standardized operations such as replication, querying and storing additional information is possible.

An apparatus and method is disclosed in U.S. Pat. No. 5,758,343, issued to Vigil, et al., which provides a means for implementing a highly scaleable X.500 directory service. A first directory service agent receives requests from a user agent and manages all information pertaining to the root of the X.500 directory tree. In addition, this first directory service agent further distributes requests to a plurality of delegate directory service agents, each of which manages a subset of the overall directory service. Since directory services typically have a limit to the number of entries they can maintain under a single process, this invention permits each delegate directory service agent to run as a separate process, potentially executing on separate processors, thus multiplying the number of allowable directory entries by the number of installed delegate directory service agents to overcome traditional limits.

Replication is an important aspect of distributing data efficiently in a large data processing system. U.S. Pat. No. 5,434,994, issued to Shaheen, et al., teaches a method for maintaining data coherency in a system in which data is replicated across a multitude of servers. Each server permits its local replica to be updated and a method is disclosed to reconcile these updates. Another invention related to replicating and partitioning data is U.S. Pat. No. 5,930,831, issued to Marsh, et al. This invention discloses an architecture to support partitioning of data among multiple file systems on a computer.

While all the aforementioned aspects of the prior art are certainly beneficial in a large heterogeneous network, our invention extends beyond the scope of most of them to solve additional problems they fail to confront. For instance, U.S. Pat. Nos. 5,689,700, 5,893,107 and 5,918,227 discuss various means for integrating directory service entries into a file system, accessing database information through a directory service, and providing uniform access method across multiple directory services. However these inventions, when examined independently or cumulatively, fail to propose a common system-independent paradigm that can be applied to any type of data ranging from a simple file residing in a file system, to an object under the control of a directory service, all the way to information residing in a traditional database. Our invention proposes a method by which data is not only classified using a common means, but doesn't mandate any relationship between the directory service, file system and database. The paradigm encompassed in the present invention permits a single access method to manipulate a file in a simple file system, locate a web page residing in an LDAP directory service, and query inventory data. For example, the file may exist in a Windows NT environment, while the LDAP directory service may be running in a Unix environment and while the inventory may be managed by a DB/2 database running on an S/390 platform. The prior art fails to address the architectural issues required to support management of data across disparate platforms.

In addition, our invention imparts a modular scaleable architecture upon a directory service, which enables features typically found in document management systems, such as version control, configuration management, locking, and release control, to be employed on objects residing in a directory service. Although the aforementioned inventions present an opportunity to offer a limited form of some of these features, the present invention architecturally binds these features to a common access protocol to permit the same features to span a virtual data management system comprising a plurality of components in which a directory service constitutes one, but not the only, component.

U.S. Pat. Nos. 5,758,343, 5,434,994, and 5,930,831 focus on methods that are beneficial to supporting directory services and file systems, such as efficiently distributing requests, permitting the directory service entries to grow in a scaleable manner, maintaining data coherency in a system requiring data to be replicated across multiple servers, and partitioning and replicating data across storage devices of disparate file systems. Our invention doesn't presume any knowledge of the underlying storage management infrastructure or low-level file management techniques being employed. As long as the data exists somewhere in the enterprise, and some means is provided for an end user or application program to classify, access and modify it, our invention can be employed. One skilled in the art can appreciate how the techniques disclosed in these and similar inventions could be used in conjunction with the present invention to further enhance its capabilities.

During our development process we have viewed the development of others. Even the best of the EDA (electronic design automation) design houses do not have an integrated approach like the one we have developed. For the purposes of this background, we will discuss some of the various approaches already used specifically viewing them in light of our own separate developments which we will further elaborate in our detailed description of our invention which follows later in this specification.

In the field of EDA, there are today several leading edge providers of Data Management technology. Among them are Cadence Design Systems, Inc., ViewLogic Inc., and Synchronicity Inc. Of course there are others, but these the companies that have the capability to provide complete data management solutions that encompass all facets of the business process including design, manufacturing, quality control, defect tracking, project management and the like. However, review of their most recent technology still affords the opportunity to make improvements in the area of scalability, modularity and adaptation of disparate environments into a seamless Data Management enterprise.

Historically many attempts have been made to manage and share data across groups of users or teams. This has typically resulted in systems that assume a particular use model and expect the users to mold their process or methodology around it. Furthermore, these systems tend to be a closed architecture which is difficult to enhance or customize. In addition these systems can be large and complex, and lacking the ability to scale from a small team of "low-end" users to a large group of sophisticated "high-end" users. U.S. Pat. No. 5,812,130, entitled "Data Management System and Method for Concurrent Engineering", U.S. Pat. No. 5,826,265 entitled "Data Management System Having Shared Libraries", U.S. Pat. No. 5,864,875 entitled "Data Management System for Problems, Releases and Parts", U.S. Pat. No. 5,878,408 entitled "Data Management System and Process", U.S. Pat. No. 5,920,867 entitled "Data Management System Having Data Management Configuration", U.S. Pat. No. 5,920,873 entitled "Data Management Control System for File and Database", U.S. Pat. No. 5,950,201 entitled "Computerized Design Automation Method Using a Single Logical PFVL Paradigm", and U.S. Pat. No. 5,966,707 entitled "Method for Managing a Plurality of Data Processes Residing in Heterogeneous Data Repositories" all issued to Van Huben et al. as well as the following patent applications U.S. patent application Ser. No. 08/847,393 (Attorney Docket No.: PO9-96-007) entitled "Data Management System for Concurrent Engineering", filed Dec. 6, 1996.

U.S. patent application Ser. No. 08/760,913 (Attorney Docket No.: PO9-96-107A) entitled "Data Management System for File and Database Management", filed Dec. 6, 1997.

U.S. patent application Ser. No. 09/103,771 (Attorney Docket No.: PO9-96-107B) entitled "Data Management System for File and Database Management", filed Jun. 24, 1998.

U.S. patent application Ser. No. 09/240,732 (Attorney Docket No.: PO9-99-008) entitled "Methods for Shared Data Management in a Pervasive Computing Environment", filed Jan. 29, 1999.
all teach various methods employing a modular scalable data management system which is also envisioned as part of the present invention. However, these inventions and applications assume a traditional data or document management environment wherein all objects under control of the data management system reside in a traditional file system and/or database. They fall short of demonstrating how the underlying principles can be expanded to encompass objects and information stored in a directory service system such as Microsoft's Active Directory or the Lightweight Directory Access Protocol (LDAP).

SUMMARY OF THE INVENTION

Our invention provides a data management system enabling a plurality of heterogeneous systems to exchange information. These systems may be comprised of one or more networks, containing simple or complex file systems, relational or object-oriented databases, directory services such as, but not limited to, Microsoft's Active Directory and the Lightweight Directory Access Protocol, or any combination therein.

The system we employ uses a data management control program tangibly embodying a program of instructions executable by a supporting machine environment for performing method steps by a data management system having a library organization which receives a request of a user initiated from said displayed client screen and fulfills the request by a providing result via our data management system. This data management system has a plurality of data managers and is provided with a plurality of data managers in one or more layers of a layered architecture. The system performs with a data manager and with a user input via an API a plurality of processes on data residing in heterogeneous data repositories of said computer system including promotion, check-in, check-out, locking, library searching, setting and viewing process results, tracking aggregations, and managing parts, releases and problem fix data under management control of a virtual control repository having one or more physical heterogeneous repositories. The system provides for storing, accessing, tracking data residing in said one or more data repositories managed by the virtual control repository.

Our invention provides user interfaces for a combination of command line, scripts, GUI, Menu, WebBrowser, etc. which maps the user's view to a PFVL paradigm. We have created a new data management architecture which is capable of being adapted to any structure based on attributes, such as the X.500 directory service. It presumes no use model thereby enabling a multitude of departments to share data without the need to follow the same use model. Furthermore, data access is provided through traditional computer systems employing a keyboard, monitor, mouse, etc. as well as nontraditional pervasive computing devices such as hand held personal digital assistants (PDAs), cellular phones, pagers, robotics, etc. Our invention is also highly modular and scalable which permits different features to be installed or configured, and allows the same system to function as either a low-end or a high-end DMS.

These and other improvements are set forth in the following detailed description. For a better understanding of the invention with advantages and features, refer to the description and to the drawings.

BRIEF DESCRIPTION OF THE DRAWINGS

FIG. 2A shows a symbolic representation of the PFVL Paradigm for both a single Package and a grouping of hierarchical Packages.

FIG. 2B shows how the PFVL Paradigm can be adapted to multiple real life applications.

FIG. 5 depicts an e-commerce application wherein the data is distributed among a directory service and a traditional database.

FIGS. 6A–6D illustrate the detailed instantiation of the PFVL Paradigm into a directory service structure using the LDAP API.

FIGS. 7A–7B depict the detailed operation of the Command Translators introduced in FIG. 1.

FIGS. 8A–8B show an example of how a DMS function is invoked with the standard API and is transferred through the architecture to the Control Repository Access layer.

DETAILED DESCRIPTION OF THE PREFERRED EMBODIMENT

Modular, Scaleable DMS Architecture Overview

Figure 1:
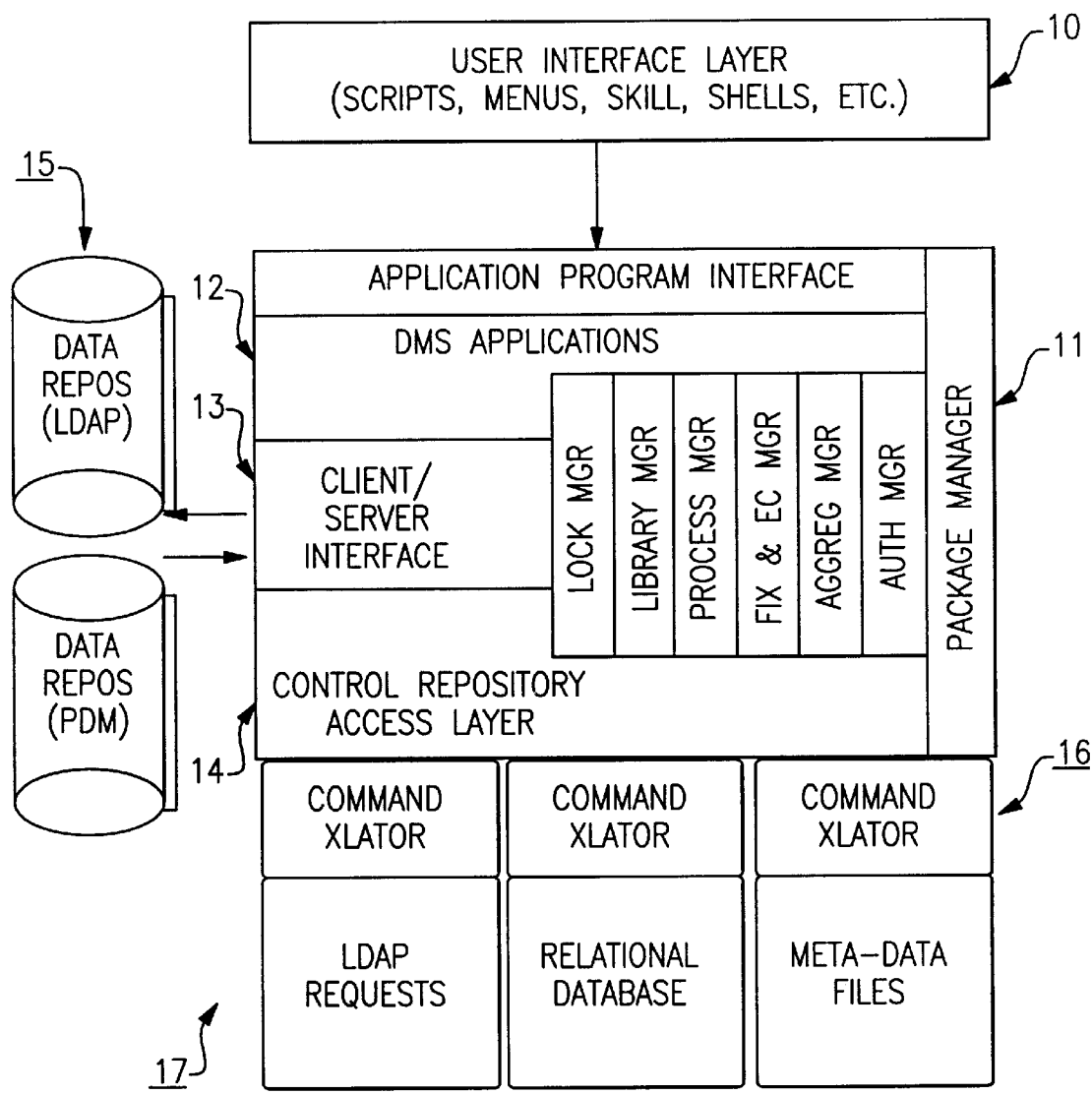
FIG. 1 shows an overview of the preferred embodiment through the use of an architectural block diagram.

The present invention employs a novel, layered architecture which permits the DMS to be constructed and maintained in a modular fashion. Additionally, this approach also allows the DMS to be easily scaled from a low-end client-only system to a large, high-end globally distributed enterprise wide data management system. In accordance with our preferred embodiment a Data Management System has a plurality of data managers and is provided with a plurality of data managers in one or more layers of a layered architecture. The system performs with a data manager and with a user input via an API a plurality of processes on data residing in heterogeneous data repositories of said computer system including promotion, check-in, check-out, locking, library searching, setting and viewing process results, tracking aggregations, and managing parts, releases and problem fix data under management control of a virtual control repository having one or more physical heterogeneous repositories. The system provides for storing, accessing, tracking data residing in said one or more data repositories managed by the virtual control repository. User Interfaces provide a combination of command line, scripts, GUI, Menu, Web Browser and other interactive means which maps the user's view to a PFVL paradigm. Configurable Managers include a query control repository for existence of peer managers and provide logic switches to dynamically interact with peers. A control repository access layer provides a common process interface across all managers, which utilizes a virtual table paradigm to standardize communication with the control repository. Command translators map the standardized control repository accesses into the appropriate format for interfacing with the underlying physical embodiment of the control repository. For example, control repository accesses can be mapped into SQL queries for a relational database, a set of FILE I/O's with appropriate inter I/O processing for table formatted files, Meta data API calls with appropriate inter I/O processing for Meta Data repositories, or any other manner by which data may be physically stored and tracked. DMS functions and utilities include an API, and a complete set of functions based on a PFVL paradigm. PFVL paradigm calls are mapped into Data Manager(s) Control Repository calls. The client/server interface is a common interface to a enterprise Client/server network, and may be reduced in size for acting for a co-resident client/server. The data repository is an aggregation of disparate data storage engines. A package manager tailors the control repository and provides methodology customization with package, variance, filetype, level granularity.

Generally, by reviewing this invention, as well as the prior application it will be appreciated that we provide as described herein a modular, scalable Data Management System which uses a single paradigm to manage similar or disparate data objects in a local or distributed client/server environment. The modular implementation method disclosed herein affords the opportunity to install, implement or configure new elements to the system as the demand changes. Furthermore, the scalable nature of our system and methods permits the same DMS to grow from a simple, low-end client-only environment to a high-end fully secure client-server implementation. The improvements which we have made demonstrate how a single data management architecture can be used to virtually any methodology or process. Our processes thus provide a framework for accommodating a plurality of physical storage repositories in addition to a centralized Control Repository which can be implemented using various means.

Generally we proceed by employing a layered architecture centered around a plurality of Managers conforming to a common data classification method known as the PFVL paradigm. This flexible paradigm allows data related to hardware design, software development, inventory control, manufacturing or any other field requiring shared data management to be tracked using the same Data Management System. All objects are tracked with a centralized Control Repository and stored in a shared Data Repository.

We use our Managers and architectural layers as a framework for a plurality of applications, functions and transactions implemented in a modular fashion. Smaller transactions and functions can be combined to form larger more complex functions or data management applications. This layered implementation promotes the concept of functions and transactions which can be instantiated in a plurality of applications. The layers also permit applications to be written without explicit knowledge of the physical implementation of the Data Management System.

Adaptation of the DMS to a user environment is accomplished through a single architectural layer. This allows the architectural core, including all the transactions and functions encompassed therein to remain methodology and environmentally independent.

Our DMS allows applications to remain methodology independent through the use of a standardized application program interface. User interfaces can be constructed to customize the same DMS application several different ways to conform to user methodologies. Conversely, our invention teaches an alternative method for implementing applications using easily customizable state tables.

Our Client/Server Interface allows the elements of the DMS to interact locally in a client-only environment or via a client/server connection. The client/server implementation can be achieved in a Local Area Network, Wide Area Network or a globally distributed environment such as the internet.

Scaleability of the DMS is achieved through the use of configurable Managers which can be switched on or off depending on the needs of the users. Since all the Managers conform to the PFVL Paradigm and follow a standardized application program interface, new Managers can be added to the system without the need to reconstruct or alter the existing DMS.

The physical implementation of the DMS is described in two sections which deal with the Data and Control Repositories separately. The Data Repository may be implemented using a plurality of means ranging from simple file systems to commercially available Product Data Management (PDM) systems such as RCS, Sherpa, MetaPhase, etc. The data can be physically located in a single storage medium such as a hard disk, local file system, or server, or distributed throughout a plethora of storage media scattered geographically. The centralized Control Repository can be implemented using several approaches, including but not limited to, relational or object oriented databases, flat files, meta data files or table formatted files. This disclosure describes the use of Command Translators which map generic Control Repository transactions to the appropriate access method corresponding to the physical implementation. This approach permits the information in the Control Repository to be migrated between different physical implementations. It even allows multiple physical implementations to act as a single logical Control Repository.

We will describe in the following detailed description our new processes and methods with respect to the overall architecture with advantages and features next with reference to the drawings.

Overall architecture

FIG. 1 depicts the overall architecture of the preferred embodiment. The entire DMS architecture is based on the PFVL paradigm, illustrated in FIG. 2, which allows the DMS to be environment and methodology independent. All interfaces into the DMS use a standard PFVL based API which provides the flexibility to use a common DMS across several similar or disparate user groups. For example, this system could be used to manage the data for both the electrical and mechanical components in an automobile company.

In order to understand many of the underlying architectural concepts conveyed in this disclosure, we turn our attention to the PFVL diagram depicted in FIG. 2. FIG. 2A illustrates the PFVL paradigm through the use of a multi-dimensional symbol such as a cube. The present invention teaches the notion that all objects resides in a Data Management System can be classified according to five basic attributes:

| | |
|---|---|
| Package | An arbitrary grouping of data objects that has some relationship or common bond with each other. Each package contains one or more variances. |
| Variance | One or more objects within a package that, when combined with the remaining objects in the same Variance or from one or more dependent Variances, comprise a coherent and meaningful collection of objects. |
| Level | A collection of objects, within a Variance, that have achieved some arbitrary degree of quality. |
| Filetype | A collection of objects sharing the same data type or format. |
| Version | An iteration of a data object. |

As an example, FIG. 2A depicts Package "A" (20) comprised of two Variances. Within each Variance are one or more data objects (21) of a given Filetype, residing at one or more Levels, with one or more Versions of the object. In the simplest case, a single Version of a single Filetype exists at a single Level within a single Variance of a single Package. Our invention achieves tremendous flexibility by allowing any of these attributes to be expanded n ways. By varying the dimensions of the cube, and the number of cubes in the Package, one can create a DMS capable of managing data in almost any environment.

The present invention also permits Packages to be arranged hierarchically. This is illustrated at the bottom of FIG. 2A where Package "A" (20) is embedded within a higher level Package (22). The higher level Package may also contain its own data objects (21) as shown in the figure. This is possible because each Package in the hierarchy has its own set of PFVL attributes. For example, a printed circuit board could be considered a high level Package comprised of various ASICs, resistors, capacitors and connectors. The ASICs on the board could be considered Packages themselves, where each ASIC Package is comprised of the underlying circuit designs.

FIG. 2B contemplates two examples of how the PFVL Paradigm can be implemented in actual applications. The first table (23) demonstrates a typical electrical engineering design environment comprised of design objects dispersed in the DMS. The primary design object is an MPEG design consisting of multiple versions of a schematic residing in the "dsgn_lib" design library. This library also contains a VHDL object for the MPEG design. It can also be seen that the dsgn_lib library contains two Levels, Test and Prod. Versions of the MPEG schematic simultaneously exist at both Levels. Most of the objects are classified under the Universal Serial Bus (USB) Variance, except for a PCI Variant of the MPEG schematic. Our invention allows Variances to be completely independent or dependent upon other Variances. In this example, if the PCI Variance is based on the USB Variance, then all objects in the USB Variance can be picked up and used in the PCI Variance, unless they need to be modified. DMS Table 23 also illustrates an additional object, the Bus Controller, which also resides in the PCI Variance of the dsgn_lib library. Finally, the diagram illustrates an MPEG Layout which resides in a separate Package known as the Circuits library.

The second DMS Table (24) in FIG. 2B shows how the same PFVL paradigm can be used to track objects and sub-assemblies in an automotive environment. In this case, Packages are used to denote the Cooling and Engine sub-assemblies as well as the Electro-Mechanical main assembly. Within each sub-assembly are one or more components described in the form of schematics, layouts and VHDL, and residing at quality levels QA1, and QA2. Also, some components exist under distinct Variances in order to accommodate two different automobile models.

Returning to the overall architectural diagram identified as FIG. 1, the top layer is the User Interface Layer (10). This layer makes possible such scenarios as sharing electrical and mechanical design information by acting as an environmental adapter. An example of such an adaptation is present in a large electronic design organization where several design groups need to share data among several libraries. A common DMS application in this scenario would be a Check-In operation which allows data to enter the DMS from a user's private work space. Since the DMS accommodates several design groups using numerous libraries, the DMS Check-In application's API requires one of the invocation parameters to be the Package. If the methodology requires all the designers on a team to check their data into a single library, the User Interface Layer may employ a local "wrapper" or user utility which only requires the user to enter the name and type of design object being checked in. This wrapper then passes this information to the DMS Check-In application. It also supplies the sole library name as the Package as well as a hard-coded Level and Variance.

To further demonstrate the advantage of the User Interface Layer, consider a second design group which also uses the same DMS to manage their data. Unlike the first design team, this one designs sub-assemblies in which each sub-assembly is treated as a Package. Since this team requires access to multiple packages, their Check-In function may consist of a "wrapper" in the User Interface Layer which invokes a menu that permits the user to specify a sub-assembly name. The wrapper then calls the same DMS Check-In application used by the aforementioned design group. However, this wrapper passes the sub-assembly name as the Package rather than hard-coding it like the first wrapper.

One skilled in the art could easily envision how the User Interface Layer can employ several methods such as, but not restricted to, wrappers, shell scripts, batch files, command line interfaces, graphical user interfaces, web browsers, menus, or voice activated systems, which would be customized to the user's environment or methodology. The advantage to this approach is it allows different methodologies or processes to utilize the same underlying Data Management System. In addition, if an existing methodology changes, the underlying DMS functions remain intact. Only the functions in the User Interface Layer need to be modified to accommodate the new methodology.

Returning to FIG. 1, our preferred embodiment contemplates the use of several layers which comprise the core architecture of the DMS. Spanning three of the layers are the DMS Managers (11). These are comprised of a plurality of functions, some of which belong to the DMS Application, Client/Server and Control Repository Access layers. By grouping these functions into isolated Managers with standardized interfaces, a great deal of modularity is achieved. Furthermore, these functions can be combined to form larger, more complex, applications. Consider the following portion of an example promotion application which illustrates one way to deploy a modular DMS:

if (Lock_Manager_Installed) { query Control Repository for any locks that exist on the file if (locks_exist) fail the promote

} if (Authority_Manager_Installed) { query Cntl Repos to see if user has authority to do the promote if (user_not_authorized) fail the promote.

} if (Process_Manager_Installed)

query cntl Repos to see if any Library Processes need to run if (library_processes_exist) invoke them and wait for completion

}

Check Promotion Criteria

Tell Control Repository to update level of the file

Perform update to Data Repos (move file, update link, etc.)

Within each code branch one or more Manager functions are invoked to perform the necessary DMS operations. By combining these functions together in an algorithmic way, one can achieve highly complex DMS applications. Furthermore, one can see how modularity can be achieved using the if statements to test the Control Repository for existence of a particular Manager. This permits Managers to be installed or configured in a "plug-n-play" manner simply by setting switches in the Control Repository.

One could also envision an alternate embodiment where all the functions within each manager are compiled into independent objects. A DMS vendor or supplier could then construct customized DM systems based on the customer's needs, simply by linking together the required modules. For example, customer "A" may only require basic data management services so the DMS provider would only link the object code from the Library, Package and Lock Managers into a "lite" version of the DMS. Customer "B", on the other hand, may require use of applications involving aggregations (configurations) and Library Processing. This customer's DMS would link the object code from the Library, Package, Lock, Aggregation and Process Managers. Regardless of the implementation method, one skilled in the art can clearly envision the advantages afforded by such a system since enhancements or changes to functions in one Manager don't require the entire DMS to be recompiled, or redistributed.

FIG. 1 also depicts the DMS Applications layer (12) which contains all the standard utilities that a user needs in order to interact with the DMS. This includes things like Check-In, Check-Out, Promotion, Locking, Library Searching, creating and tracking an aggregation or configuration, and setting or viewing process results. These utilities are described further is this disclosure as either functions residing within a particular Manager, or applications which consist of one or more functions, confined to a single Manager or involving a plurality of Managers. All functions and applications within this layer follow a consistent, standardized Application Program Interface which allows them to remain isolated from any user environment or methodology. This feature of the invention allows a single DMS to be deployed through several user groups performing similar or disparate work, yet having the need to share data between them.

In the preferred embodiment, all functions and applications communicate with the Control and Data Repositories through the Client/Server Interface (13) layer. This is an expandable or contractible layer designed to allow either communication between the various layers in a client-only environment or between clients and one or more servers existing anywhere in a global enterprise. The same set of Manager functions, DMS applications and Control Repository Access routines are utilized regardless of the client/server topology.

All communication into the Client/Server interface layer are directed to either the Control Repository Access Layer (14) or the Data Repository (15). The Control Repository Access Layer consists of one or more "transactions" which perform simple or complex operations against the Control Repository (CR) itself. These can typically be categorized as adding information to the CR, modifying existing information in the CR, deleting information from the CR, or extracting (and potentially filtering) information out of the CR. Regardless of the type of operation, all transactions in this layer are written as if the control Repository is a single virtual repository consisting of tables organized around the PFVL paradigm. This approach allows different physical implementations of the Control Repository. It even permits a plurality of physically different implementations to appear as a single virtual Control Repository.

Our invention further contemplates a virtual Data Repository (15) comprised of one or more physical repositories. The underlying repositories can be a simple file management system such as the Distributed File System (DFS) or a simple directory structure organized on a hard or floppy disk. Correspondingly, the data repository could be constructed using proprietary or commercially available storage engines or PDM products such as RCS, Sherpa, MetaPhase, SCCS, CMVC, and ClearCase. Furthermore, the present invention permits Automated Library Machines to be employed as Data Repositories. As shown in FIG. 1, all communication with the Data Repository is performed through the Client/Server Interface layer, which permits the Data Repository to be locally accessible to the client, or distributed anywhere in the global enterprise on a remotely accessible server.

Figure 3A:
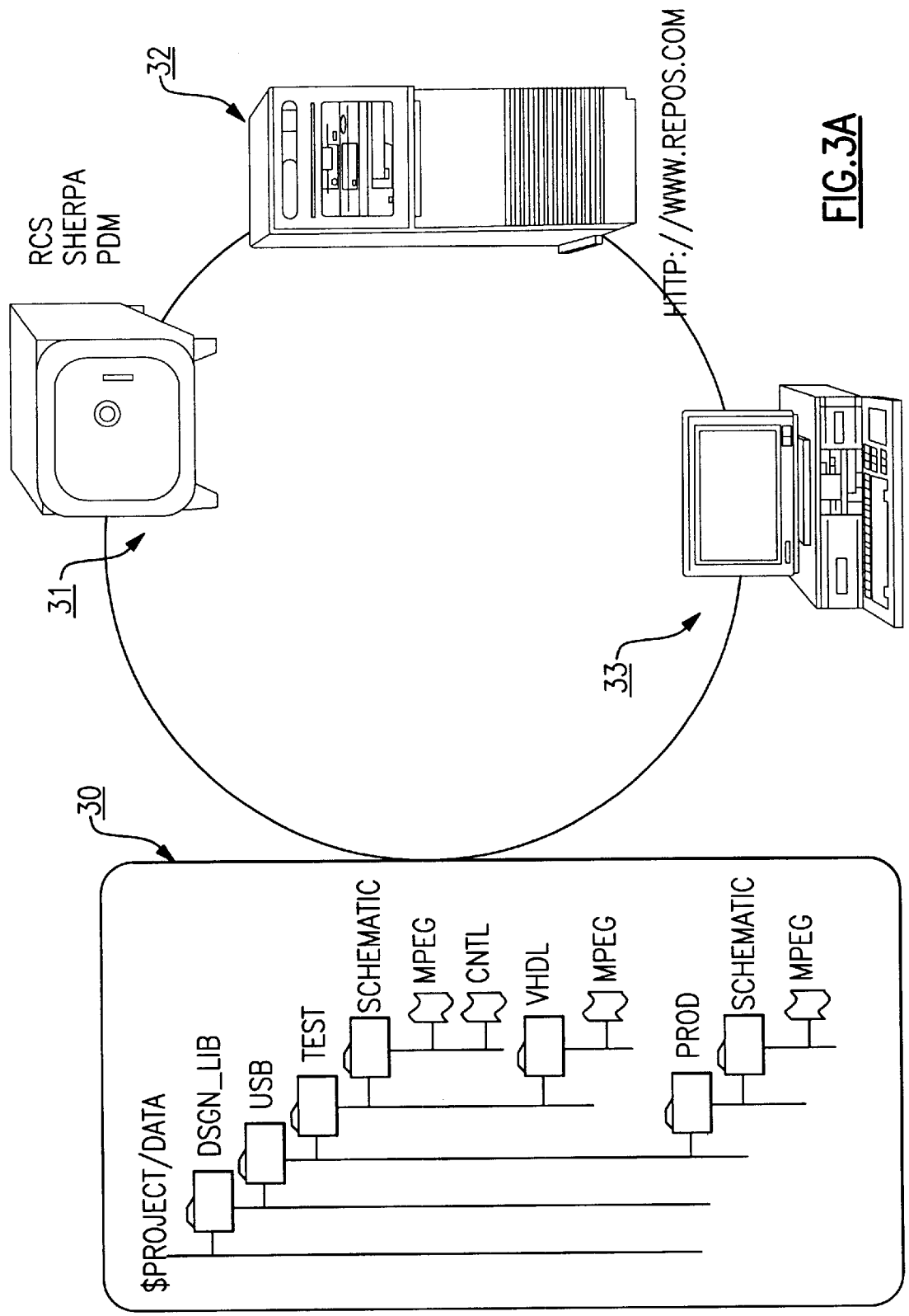
FIGS. 3A and 3B depict a complex Data Repository illustrating various means in which data can physically reside in the Data Management System.
Figure 3B:
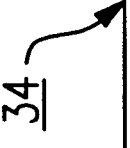

FIG. 3 depicts a complex Data Repository comprised of Data Repository "A" (30) which is a simple unix directory where the files in the DMS may reside. One skilled in the art can see how a similar structure can be employed on other file systems such as DOS, Windows NT, Linux, etc. Additional data may be stored in Data Repository "B" (31) which is a commercially available PDM such as RCS or Sherpa. Although these storage engines automatically handle revision control whenever a user checks data into or out of the system, the preferred embodiment maintains it's own unique file identifier in the form of a File Reference umber within the Control Repository. The main reason for this is that it allows all data in the DMS to be tracked in a similar fashion regardless of the physical storage method employed. Furthermore, if the data ever needs to be transplanted from one storage engine to a completely different one, the operation can be accomplished by checking the data out of the old storage engine, checking it into the new one, and updating the associated Control Repository table which maps the File Reference number into a revision number. Since all information associated with the object is tracked by PFVL and File Reference number, the information is kept completely in tact even if the old and new storage engines use completely different revision control methods. One can also envision a simpler alternate embodiment wherein the revision number of the commercial storage engine plays the role of the File Reference number.

Returning to FIG. 3, Data Repository "C" (32) could be a physical location on a server accessible via a Universal Resource Locator (URL) on the World Wide Web (WWW). Although all data in this system is stored using a variety of means, the PFVL Paradigm serves as the common storage model such that any client (33) can interact with the data. Furthermore, data is directed to the appropriate Data Repository through the use of the Data Repository Table (34). It clearly illustrates how the PFVL attributes can be used in any combination to segregate the data into one or more physical repositories. For example, all VHDL in the MPEG design library will be stored in Repository "B" which represents one of the commercial revision control engines such as RCS or Sherpa. Wiring Layouts for the Rel__1 Level of the Base Variant of the MPEG design library are stored in a DFS directory represented by Repository "A", and customer documentation for the MPEG design is stored in a publicly accessible URL on the World Wide Web (WWW) represented by Repository "C."

One skilled in the art will also note that the use of wildcards in conjunction with the PFVL attributes permits a great deal of granularity in storage partitioning. The example shows a wildcard (*) in the Filename field, but this could also be filled in with a specific file or a family of files matching a certain pattern. Additional fields could also be added to the table such as a Version field to allow data to be physically segregated by revision number, File Reference numbers, or any pattern of said version control mechanisms. This approach offers the advantage of being able to not only use different storage methods for different types of data, but also solves problems associated with large, incompressible, files filling up physical storage media. This problem is prevalent in many commercial available data management systems which require either entire libraries or entire releases of data to be physically stored using the same means under a common directory structure.

Returning to FIG. 1, the bottom of the diagram shows the Control Repository (17) which can be implemented using a multitude of methods, including, but not limited to, Table Formatted Files, Relational or Object Oriented Databases, or Meta-Data files in any format. Our invention also permits one or more of the above implementations to be used simultaneously to comprise a single virtual Control Repository. Regardless of the physical implementation of the Control Repository, all information is organized under the PFVL paradigm such that any entry in the repository directly or indirectly maps to one or more PFVLs. This permits users to access information about any object residing in any Package or library, at any Level or Variance regardless of whether that piece of information exists in a relational database, a simple ASCII file or a binary encoded MetaData file. Information can be freely reorganized or transplanted between different Control Repository implementations without the need to modify any DMS Applications, Manager functions or Control Repository Access transactions. Tables support underlying Manager functions and DMS Applications. A key player in enabling the aforementioned feature are the Command Translators (16) which interface between the Control Repository Access Layer and the Control Repository (17). Each physical implementation of the Control Repository would employ a unique Command Translator to map the generic Control Repository Access transactions into the appropriate command to satisfy the physical repository. Our invention contemplates the use of any syntax structure for the Control Repository Access (CRA) transactions. The syntax can be chosen to accommodate the physical embodiment of the DMS. The only requirement is that the syntax adheres to the PFVL paradigm. For example, in an homogenous environment where the entire Control Repository is implemented as a relational database, the CR Access transaction syntax might be structured in a manner similar to SQL commands. Thus, only a minor translation may be required prior to interfacing with the relational database. On the other hand, a heterogeneous environment with several physical implementations of the Control Repository may employ a much more generic CRA syntax based on a flexible programming structure more adept to multiple translations.

In a similar manner to the Data Repository, this approach also enables a great deal of flexibility in upgrading the Control Repositories or permitting data from disparate sources to appear as one logical repository. For example, a SQL database may be employed as the primary Control Repository which includes all information necessary to track each object in the DMS by File Reference, PFVL, physical location, etc. This repository may also contain a Part Number table for all the manufactured pieces of a product. Off to the side might exist a Lotus Notes database containing service call or defect repair information organized by Part Number for the same product. Our invention would allow Control Repository Access transactions to be written, using an identical generic syntax, to extract design information about the part from the SQL database and repair actions from the Lotus Note database. This permits someone with no knowledge of the underlying Control Repository structure to write a DMS Application to invoke said functions and create a customized report containing information from both databases. The Command Translators would be responsible for mapping the generic transactions for the design information into a true SQL query, and the repair action transaction into a Notes extraction.

Integrating Directory Services into S.O.M.A.

Having thus described the Scaleable Open Management Architecture (S.O.M.A.), we now turn our attention to the preferred embodiment which incorporates S.O.M.A. into a directory service such as those defined under the X.500 standard, Lightweight Directory Access Protocol (LDAP), Novell Directory Services (NDS) and Microsoft's Active Directory. Although the preferred embodiment envisions integrating LDAP into S.O.M.A., one skilled in the art can appreciate how the methods described herein can be applied to any of the aforementioned services.

Figure 4A:
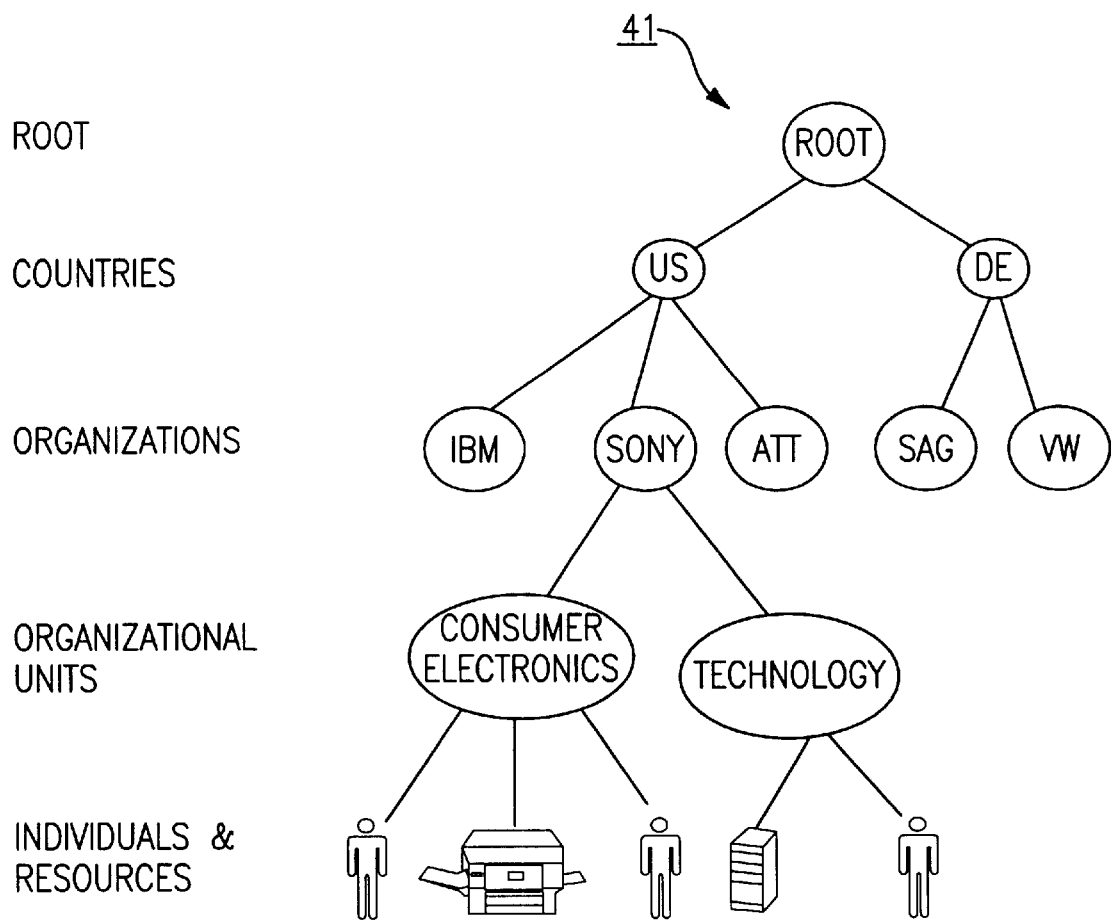
FIGS. 4A, 4B illustrate how a traditional organization managed through an LDAP directory service can be expanded to incorporate the PFVL Paradigm.

The LDAP architecture offers several key features that make it a perfect match for S.O.M.A. For example, it permits a hierarchical directory structure to be established which mimics the organizational structure of a business. FIG. 4A illustrates an example LDAP directory structure (41) which depicts the highest level of the directory tree as root. Within root, directories are divided by geography, then business, then organizations within each business. Depending on the size of the business, these may be divisions, organizational units, subsidiaries, departments, business units, etc. Since LDAP can accommodate virtually any size organization, from a single individual to the largest company, it serves as a universal standard for accessing information about people and resources in a particular business organization.

Figure 4B:
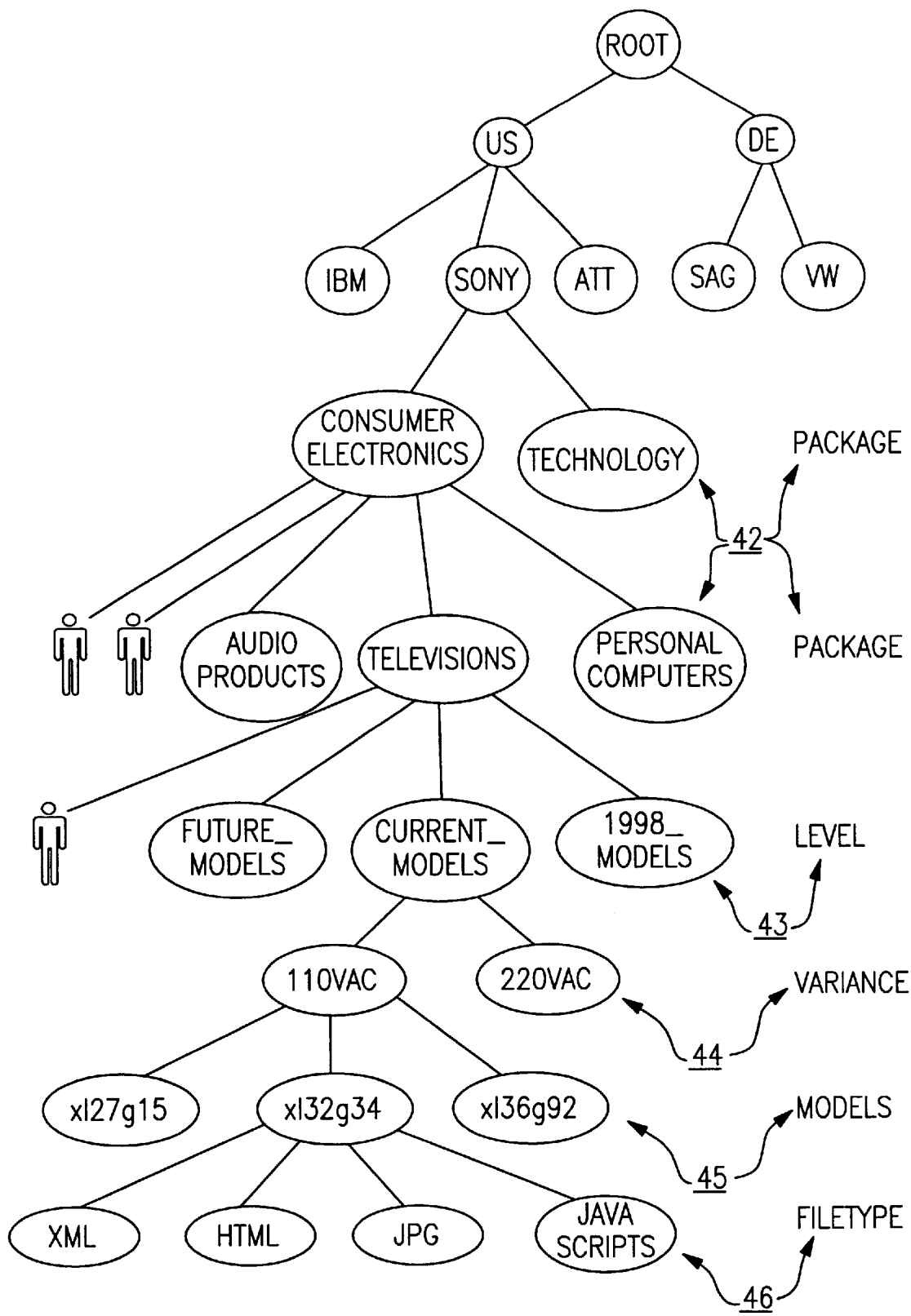

However, since the traditional role of directory services has been limited to supplying information pertaining to network infrastructure, the standard LDAP schema fails to provide a universal means for accessing data and product information within a business organization. For instance, a typical directory service may be employed to manage a company's web site. The LDAP protocol permits the user to easily navigate through the organizational hierarchy and locate a web page pertaining to a particular group such as consumer electronics. Additional web pages containing product information may also reside in the directory service, but to fully embrace e-commerce the information currently managed by the directory service must be integrated with detailed product information that may exist in other heterogeneous repositories. For example, a product may have inventory, manufacturing, and distribution information stored in a traditional database or data warehouse, engineering data in some type of design repository, and customer/supplier data residing in a groupware application such as Lotus Notes or Domino. Our invention offers the means by which all of this data can be accessed through the directory service. Consider the following example of an e-business conducting on-line transactions over the Internet. LDAP or Active Directory could be used to store and manage the web pages, images and Java scripts which comprise the on-line store front. The actual product and customer order information is likely to be stored in a traditional database. Our invention would permit a uniform data management paradigm to encompass both sets of data. In this manner one could query information about a product based on Package, Variance, Level and Type with command translators accessing the appropriate repository. FIG. 4B expands on the conventional LDAP directory structure by applying the PFVL paradigm. In our example, the Sony corporation is divided into two organizational units, Consumer Electronics and Technology. Our invention classifies each of these as a Package (42). Consumer Electronics is further divided into Audio Products, Televisions, and Personal Computers. These are also classified as Packages (42) since our invention permits hierarchical packages. At this point, a conventional directory service may simply store product information about all the televisions. Our invention improves upon this by permitting the additional PFVL attributes to be mapped into an LDAP service. FIG. 4B depicts Televisions broken down into 3 Levels (43), future_models, current_models and 1998_models. The current_models are divided by Variance (44) into the 110 volt and 220 volt variants. Each Variant is comprised of several Models (45). Finally, each model contains directories for several FileTypes (46). These directories comprise the various types of data that might be required to support an e-business, such as HTML and XML pages, JPG images of the products and Java applets.

The advantage of applying the PFVL paradigm to the data types stored in the directory structure is that data residing outside of the directory service can also be classified using the same PFVL paradigm. Thus, seemless access to both repositories becomes viable. For instance, one can envision how the aforementioned example can be used to manage all the elements necessary for an end user to display a web page on his client computer which describes all the features of the xl32g34 model television, including a JPG photo of the product. However, this product information would have to exist within an HTML or XML web page. Our invention improves on this by allowing the user to obtain dynamic product information such as the quantity of xl32g34 models available in the inventory even if the inventory is being managed by an Oracle or DB/2 database. This is possible because the inventory databases can be managed with the same paradigm by creating Package, Level, Variance, and Model fields within the database tables, and organizing the inventory data accordingly. The HTML page would simply provide "static" product information and could employ a java applet to query the dynamic information, such as, available inventory, from the database.

There are several benefits to this approach. To begin with, it shields the application developer from knowledge about the underlying database. If the inventory system is replaced in the future with something completely different, as long as the inventory data retains the PFVL paradigm, the application querying the data doesn't need any modification.

Secondly, Levels and Variances are an integral piece of the S.O.M.A. architecture and our invention applies these concepts to directory structures as well. For example, the television models can be classified by Level as Current_Models and New_Models. This becomes useful during the introduction period of a new product line. Prior to introduction, all the data pertaining to the new models can be installed in the New_Models directory and this serves as a "sandbox" to test the entire system without affecting the production environment centered around the Current_Models. The web site can be exercised, including mock transactions, to ensure that not only the web pages, links, Java scripts, etc. are working but any associated data residing in the traditional databases is also correct (i.e. pricing information, product specs, retail marketing information, etc. Once the testing is complete, S.O.M.A. allows cross platform promotions between levels, so all the data necessary to support the new models can be promoted into the Current_Models level. At this point the new product line is officially accessible by the general public and on-line ordering can begin.

Finally, S.O.M.A. further allows modular expansion of features using Managers. The present invention further contemplates the use of said Managers to interact with data in heterogeneous environments. For example, the Process Manager can be used to automate a Library Process which is initiated during a promotion between levels. Continuing with the Sony on-line store, a Library Process could be written which automatically reduces the price of outgoing television models and uses the LDAP services to send e-mail to key retailers encouraging them to hold "fire sales" and deplete excess inventory of the older models as well as begin advertising the new models.

Our invention accomplishes the aforementioned concepts by first defining PFVL attributes for each entry managed in an LDAP directory. For instance a web page for a particular model television might have the following LDAP attributes shown in FIG. 5. The LDAP attribute table (51) depicts how the PFVL attributes can be seamlessly integrated into the existing LAP attributes to permit an LDAP query to locate a piece of information based on qualifiers such as country, organization, organizational unit, package, level, variance, model and data type. Similarly, a relational database table (52), such the one shown in FIG. 5, may contain product information for all televisions.

Our invention has the advantage of the user being able to access all information using one interface. The Sony web site could have a web page listing all Consumer Electronics with a link called Televisions. When the user clicks on the link, a form would be displayed where the user can select either current models or older models. The form would generate a PFVL-based query requesting a listing of model numbers, which the S.O.M.A. architecture would translate into a relational database query and obtain the list from the database table. The user would then select the desired model, each of which may has it's own web page. When the user clicks on the desired model, another PFVL-based query would ensue, but this time the S.O.M.A. architecture would translate it into an LDAP request for the web page. The LDAP client would incorporate the aforementioned LDAP attributes to launch the request to the LDAP server, which would invoke the LDAP search routine to locate and deliver the desired web page for that model television.

FIG. 6 illustrates the detailed instantiation of the PFVL Paradigm into a directory service structure using the LDAP API for the Sony example of FIG. 4.

The objectclass definitions used to implement the Sony example are industry (61), sector (62) and appliance (63). These objectclass definitions specify the required and allowed (optional) attributes. All LDAP entries are required to have an objectclass attribute to describe its contents. For example the industry objectclass (61) requires the objectclass, c, o, ou and sector attributes. The sector objectclass (62) requires the c, o, ou and cn attributes. The appliance objectclass (63) requires the c, o, ou, partno, pl, level, var, model, size, color, spec and filetype attributes. It may optionally contain the msrp attribute.

The c (country), cn (common name), o (organization) and ou (organizational unit) attributes are standard LDAP attributes.

The syntax of the additional attributes sector, pl (product line), level, var (variance), model, filetype, partno, size, color, spec (specification page html) and msrp (manufacturers suggested retail price are described in attribute definitions (64) in LDAP protocol terms.

Referring to FIGS. 4 and 6, the package (42) portion of the PFVL Paradigm is represented by the combination of the industry (65) and the sector (66) entries. The appliance (67) entries complete the level (43), variance (44) and filetype (46) portions of the PFVL Paradigm.

Control Repository Access Layer

Our invention contemplates the use of a separate Control Repository Access Layer comprised of a library of functions or transactions which extract, add, modify or delete information from the Control Repository. There are two main advantages to separating this code from the functions comprising the DMS Application Layer:

1. Many transactions can be used in multiple DMS applications, so in an effort to modularize the code and prevent duplication, one skilled in the art could envision how these transactions can be instantiated in DMS applications much like a logic designer instantiates circuit macros.

2. In larger DM systems where performance is a critical issue, it is frequently prudent to combine several smaller transactions into "macro" transactions. This is best performed by someone with intimate knowledge of the internal organization of the Control Repository. By separating the CR Access functions from the DMS applications, the end users can readily modify the DMS applications without acquiring the aforementioned knowledge.

3. This approach readily lends itself to a plurality of physical embodiments of the Control Repository since all the transactions can employ the same format, and only the command translation code needs to be personalized for its associated physical Control Repository.

4. One physical embodiment of a Control Repository can be replaced with a different physical embodiment without the need to alter any of the DMS applications or underlying Control Repository Access transactions. The administrator of the Control Repository need only update the command translation code to reflect the new physical embodiment.

One key aspect of the present invention is the use of Command Translators which perform the role of converting a generic "PFVL-based" query into the appropriate syntax for communication with the underlying control repository. The use of a command translator to remap a PFVL-based request into an LDAP request becomes rather straightforward if one considers the LDAP API published as rfc1823 for the Networking Working Group by T. Howes and M. Smith from the University of Michigan. Their proposed API offers the following functions for manipulating LDAP entries:

ldap_search // searching the LDAP directory for a requested set of attributes ldap_modify // modify information regarding an existing LDAP entry ldap_modrdn // change the name of an LDAP entry ldap_add // add an entry to the LDAP directory ldap_delete // delete an entry from the LDAP directory These functions are analogous to their counterparts in a typical relational database, therefore our invention would merely take the original PFVL-based query and make the appropriate translation based on the type of data requested. For instance, a web page for a particular television model may contain two links; one to click on to request the price and the other to see a JPG image. The Java applet rendering the web page would initiate two nearly identical PFVL-based requests Get_Price(Package=Televisions, Level=Current_Models, Model=xl32g34, Variance=110v)

Get_Image(Package=Televisions, Level=Current_Models, Model=xl32g34, Variance=110v)

However, the first request would be remapped to a SQL query such as:

SELECT Price FROM (Package,Level,Variance, Model) VALUES(Televisions, Current_Models,110v,xl32g34)

which would return the price back to the client's Java applet for display on the screen. The second request would use the PFVL attributes to construct the proper LDAP Relative Domain Name (RDN) and invoke a request for the associated JPG for rendering by the client's browser. The obvious advantage of our invention is that the client code can work with a single data model governed by a uniform API even though the underlying data may be distributed throughout several types of repositories.

Figure 7A:
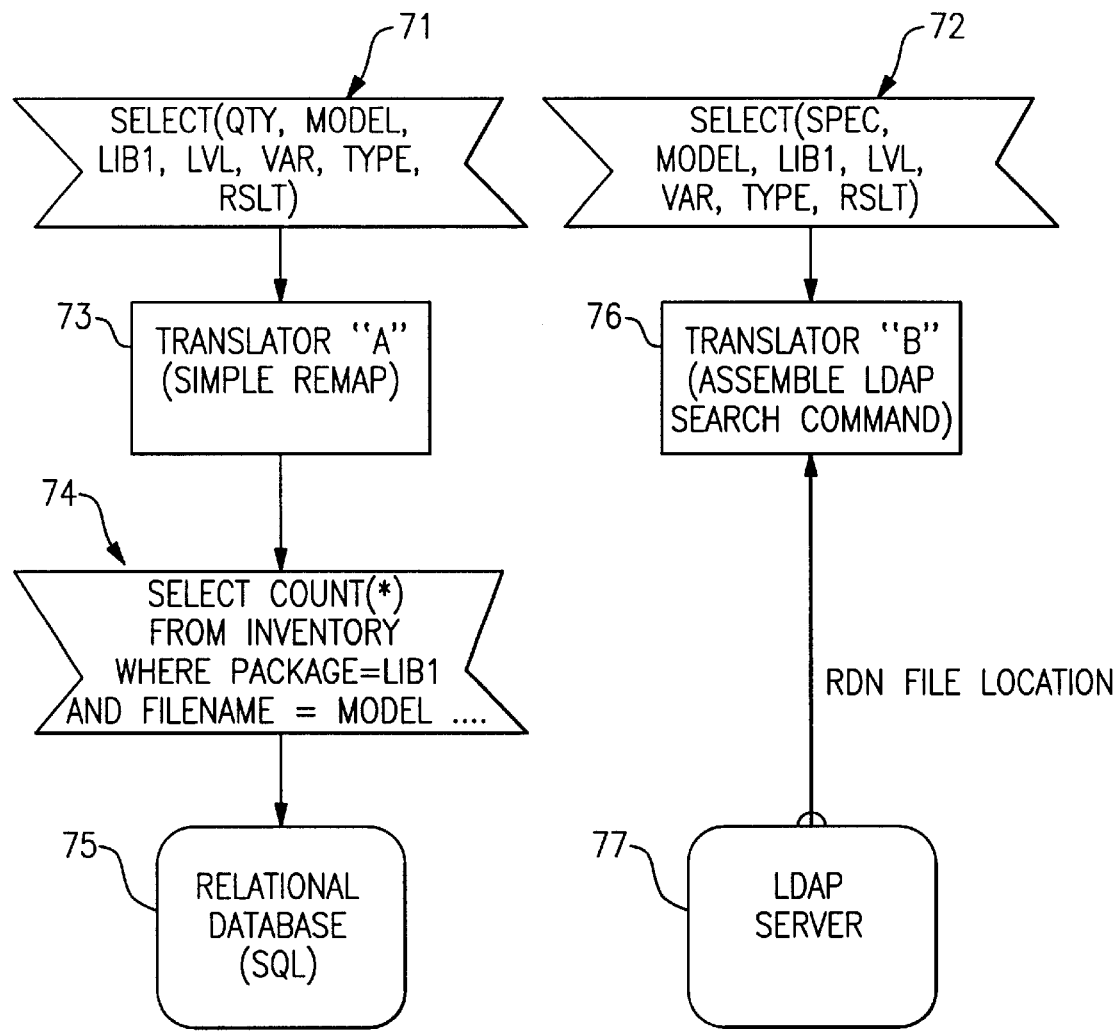

FIGS. 7A and 7B illustrate a detailed example employing said command translators in a heterogeneous environment with two disparate physical Control Repositories which together comprise a single virtual Control Repository. The virtual Control Repository contains an inventory table and a Relative Domain Name (RDN)table. In this example, the Get_Quantity (71) transaction is used to query the quantity of a particular television model currently in inventory. Similarly, the Get_FileSpec (72) transaction is used to locate a web page or graphical image of the television model from an LDAP repository. One will immediately notice that both transactions utilize a similar syntax. In both cases, all PFVL (Package, Filetype, Variance, Level) information is supplied. It is also important to note that one can't deduce the manner by which the control information is physically organized or stored, nor can one deduce whether the authorization and financial results are stored in the same or different Control Repositories.

The Get_Quantity (71) transaction is then processed through Command Translator "A" (73) which performs a relatively simple remap into the appropriate SQL queries (74) to interface with a Relational Database (75) where the inventory information resides. This query would return the quantity of which could then be displayed on a web page, included in a report, etc.

Conversely, the Get_FileSpec (72) transaction is processed through Command Translator "B" (76) which forwards the request to an LDAP Server (77). Unlike the inventory table, the RDN table is comprised of LDAP attributes, such as those depicted in FIG. 6. Therefore, this translator would need to repackage the PFVL information into an LDAP search to return the exact location of the desired file. For example, the application may wish to display an image of the television alongside the inventory information. The Get_FileSpec transaction could request the location of a JPG for that particular model, by specifying "JPG" for TYPE. Additionally, TYPE could be set to "*" if the developer wanted to query all available image types for that model. An example routine (78) is shown in FIG. 7B which establishes a connection to the LDAP Server (77), maps the PFVL attributes into the proper syntax to make an ldap_search_s query, and then parses out the resulting file spec information. Once again, the application developer doesn't need to know how the data is physically stored in the directory service. In fact, the developer doesn't even know the data is managed by a directory service.

One of the key advantages contemplated by this invention is that the DMS application writer only needs to reference the available transactions and their parameter lists. Once the application is written, it can remain intact, even if the underlying physical Control Repositories are further distributed, combined or in any other way reorganized. For example, if the LDAP repository is replaced by Microsoft's Active Directory, thus requiring modifications to the directory services API, only the Command Translator (76) needs to be modified. The DMS application remains intact.

The aforementioned example also demonstrates another advantage of the present invention. One could envision a scenario whereby the users initially interact with both physical control repositories via a traditional computer system employing those elements typically found in said system, such as a keyboard, monitor, central processing unit, memory, mouse, etc. In such an environment, the users would obtain authorization to query financial data by manually entering their employee identification. Suppose the desire exists to improve the authorization process by introducing a pervasive device such as a badge reader or biomedical device such as retina or iris scanner. By using a generic API for the Control Repository Access functions, one could appreciate how much easier it would be to interface with nontraditional devices such as badge readers or retina scanners since they only need to provide information to be passed to the Command Translator. Since the device doesn't directly communicate with the Control Repository it can employ a relatively simple protocol such as TCP/IP or RS232, and doesn't need to generate complex commands such as SQL queries.

Figure 8A:
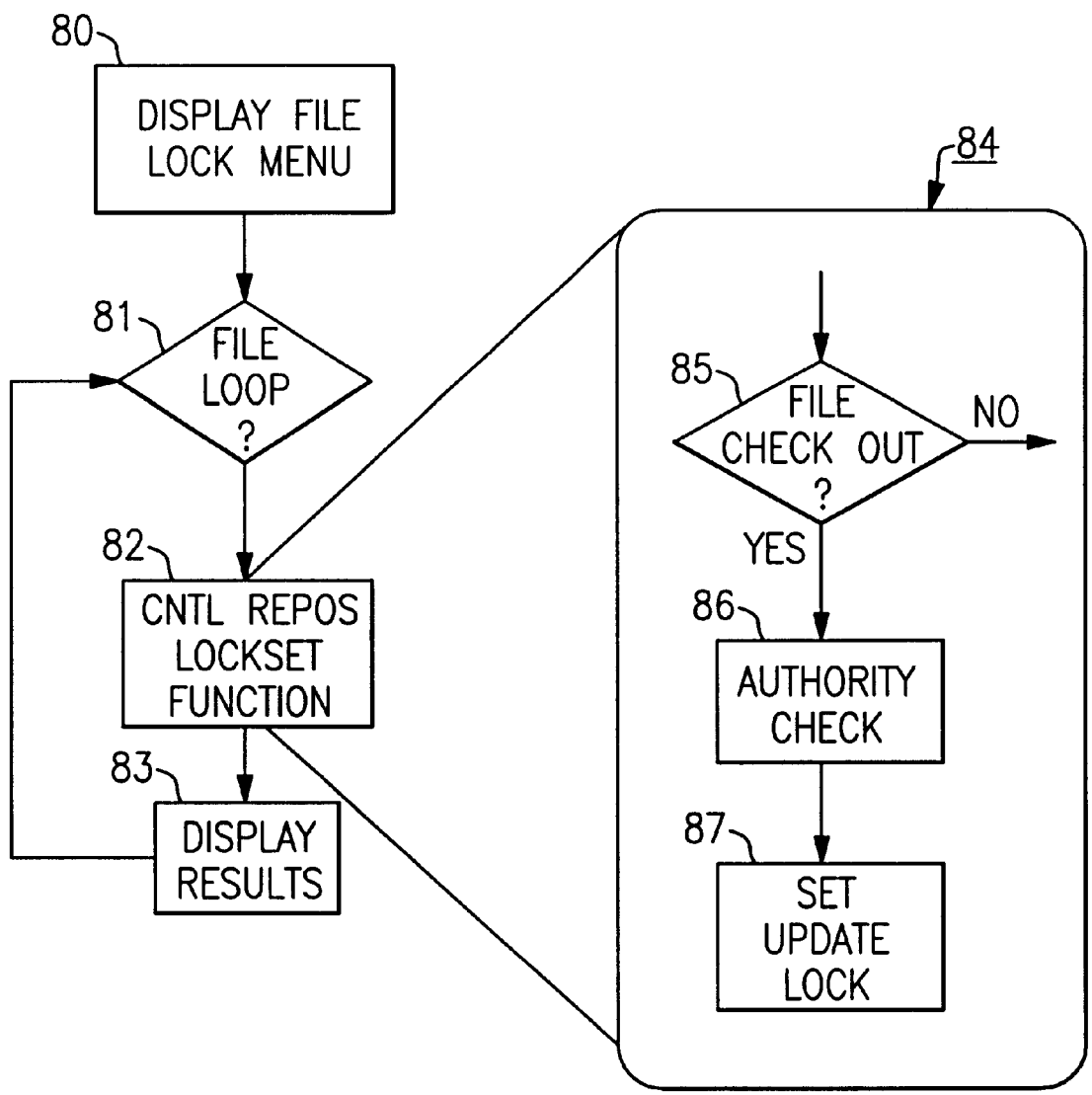

One might conclude from the previous example that our invention implicates a one-to-one correspondence between Control Repository Access functions and Command Translators. However, our invention permits any combination of Control Repository Access transactions to interact with any combination of Command Translators to communicate with any combination of physical Control Repositories. FIGS. 8A and 8B illustrate how the various architectural layers can be used to achieve greater overall processing efficiency. In this example, it necessitates the use of a single Control Repository Access transaction to perform multiple repository accesses.

The left side of FIG. 8A depicts the control flow of a simple DMS application designed to establish an ownership or File Check Out for Update lock on a data object. This is a typical requirement for any data management system that permits multiple users to access and update the same piece of data. Step 80 displays the File Lock menu which can be any type of text based or graphical menu in which the user enters the necessary Package, Filetype, Variance, Level and Filename of the object they wish to update. One can appreciate how this step could utilize code similar to that previously disclosed to test for the existence of various Managers and tailor the menu accordingly.

In this example, the application permits the user to select multiple files so Step 81 sets up a File Loop to perform the desired action for each file. Step 82 represents the Control Repository Access transaction for setting an ownership lock. Step 83 displays the results of the lock setting operation back to the user. To further illustrate the advantage of this invention, assume that the example employs an implementation which submits the lockset CRA transaction through the client server interface illustrated in FIG. 1. Also assume that the example methodology requires that only authorized users of the DMS may establish ownership locks.

The layered architecture disclosed in the present invention permits a very efficient implementation of such an example environment. The right side of FIG. 8A (84) depicts the internal steps comprising the CRA lockset transaction (82). Our invention contemplates the use of several different types of locks on data objects in the DMS, therefore the Lock Menu (80) may offer the user a choice of locks. Therefore, the first step in the internal lockset transaction (84) is Step 85 which tests to see if the type of lock desired is an ownership lock (file check-out). Step 86 then queries the Authority table to ensure the user is authorized to update the requested file. The virtual Authority table (88) is shown in FIG. 8B. Step 87 then performs the necessary updates to the Lock table (89) also shown in FIG. 8B. Since steps 86 and 87 are both required for all File Check Out operations, it's more efficient to combine them into a single Control Repository Access transaction. This way, all the overhead associated with the client/server communication is only incurred once per file.

It is worth noting that both tables are structured identically, but this does not imply they reside in the same physical Control Repository. In fact, it's not possible using FIG. 8B to discern how these tables are physically organized, nor if they reside in the same or separate physical embodiments. The present invention permits the data comprising a virtual Control Repository to be organized in any physical arrangement desirable, and furthermore, one or more of these physical Control Repositories can be accessed from the same CR access transaction. Conversely, multiple CR access transactions can access data from the same physical Control Repository. The existence of Command Translators in our invention permits any conceivable arrangement of Control Repository Access transactions to interact with any organization of one or more physical Control Repositories.

Additionally, this example demonstrates a further advantage of having the DMS applications architecturally segregated from the CRA transactions. If the user desires to set ownership locks on all the files of a given Type in a given Level and Variance of a particular Package, then the File Loop (81) could recognize this and rather than initiating a multitude of CRA transactions for each selected file, it could generate a single transaction substituting a "*" for the Filename.

The aforementioned example shows how a single CRA transaction may require a plurality of control repository accesses. However, our invention does not mandate the quantitative relationship between accesses and the underlying command translators. For example, the authority check in Step 86 and the lock table update in Step 87 will both employ command translators, but said translation code can be implemented in any desirable embodiment. Each step may call an independent translator implemented as an independent entity, or both translators could be embodied together within the same entity. Our invention even permits the translation code to be incorporated directly into the Control Repository Access transaction code as subroutines, methods, etc. One skilled in the art could appreciate how various programming techniques such as dynamic link libraries, subroutines, modules, and features found in object oriented programming languages can work in concert with the flexible architecture disclosed herein to produce the most efficient means of packaging the numerous CRA transactions and command translators which might comprise a typical data management system.

Figure 9A:
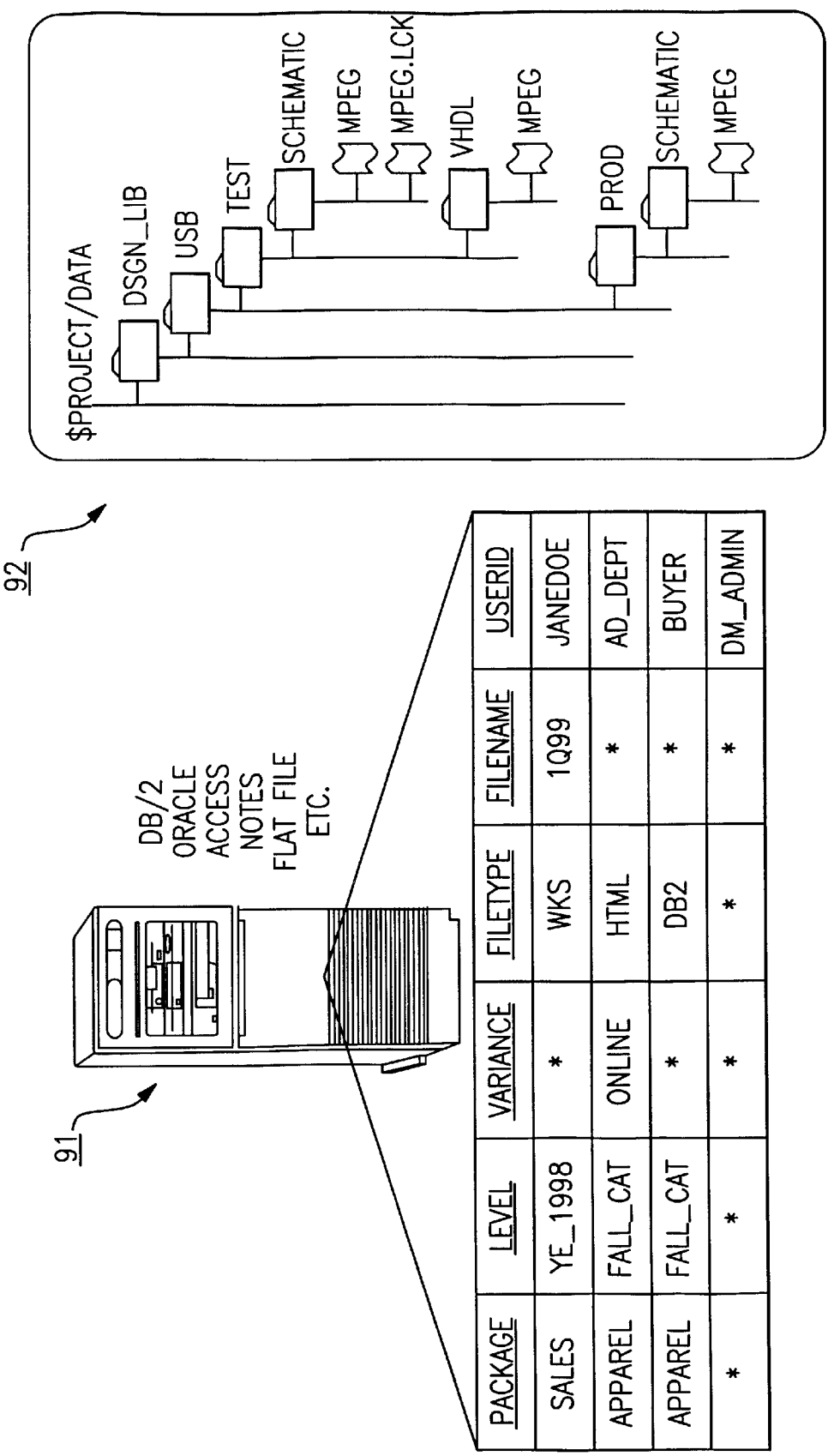
FIGS. 9A–9B show examples of Control Repository Access transactions

Turning our attention to FIG. 9A, the illustration depicts a heterogeneous physical Control Repository comprised of an Authorization table physically stored on a server (91) using a conventional database application such as DB/2, Oracle, Access, Notes, or even a flat file. One advantage to using this type of implementation is that the virtual Authorization table can be physically manipulated using the traditional row and field paradigm.

On the other hand, the Lock table is physically implemented as a plurality of .LCK files resident in a directory structure (92) mapped to the PFVL architecture. The directory structure (92) shows a typical engineering design library where the Package=DSGN_LIB, Variance=USB, Level=TEST, Filetype=SCHEMATIC, and Filename= MPEG. The MPEG.LCK file denotes the existence of a lock on this particular file. The contents of the MPEG.LCK file contain other information such as the identity of the lock owner, and the type of lock. One can see how this physical arrangement can be derived from a virtual Lock table such as the one depicted in FIG. 8B.

Although this specific example only depicts seven fields of information in the virtual Lock table, one can see how this can be expanded to add additional information such as time/date when the lock was set, reason for the lock, or any other desirable meta data, and how this additional information can be easily added to the contents of the .LCK file.

In addition, one skilled in the art can appreciate how other files in this example system can contain their own .LCK files, or how alternate embodiments of this system could use various other means of implementation including but not limited to symbolic links, Directory Service attributes, flat files which contain information on a plurality of locks, multiple lock files per data object, etc. Once again, the preferred embodiment only conveys a small subset of the possibilities afforded to the user by the present invention.

Figure 9B:
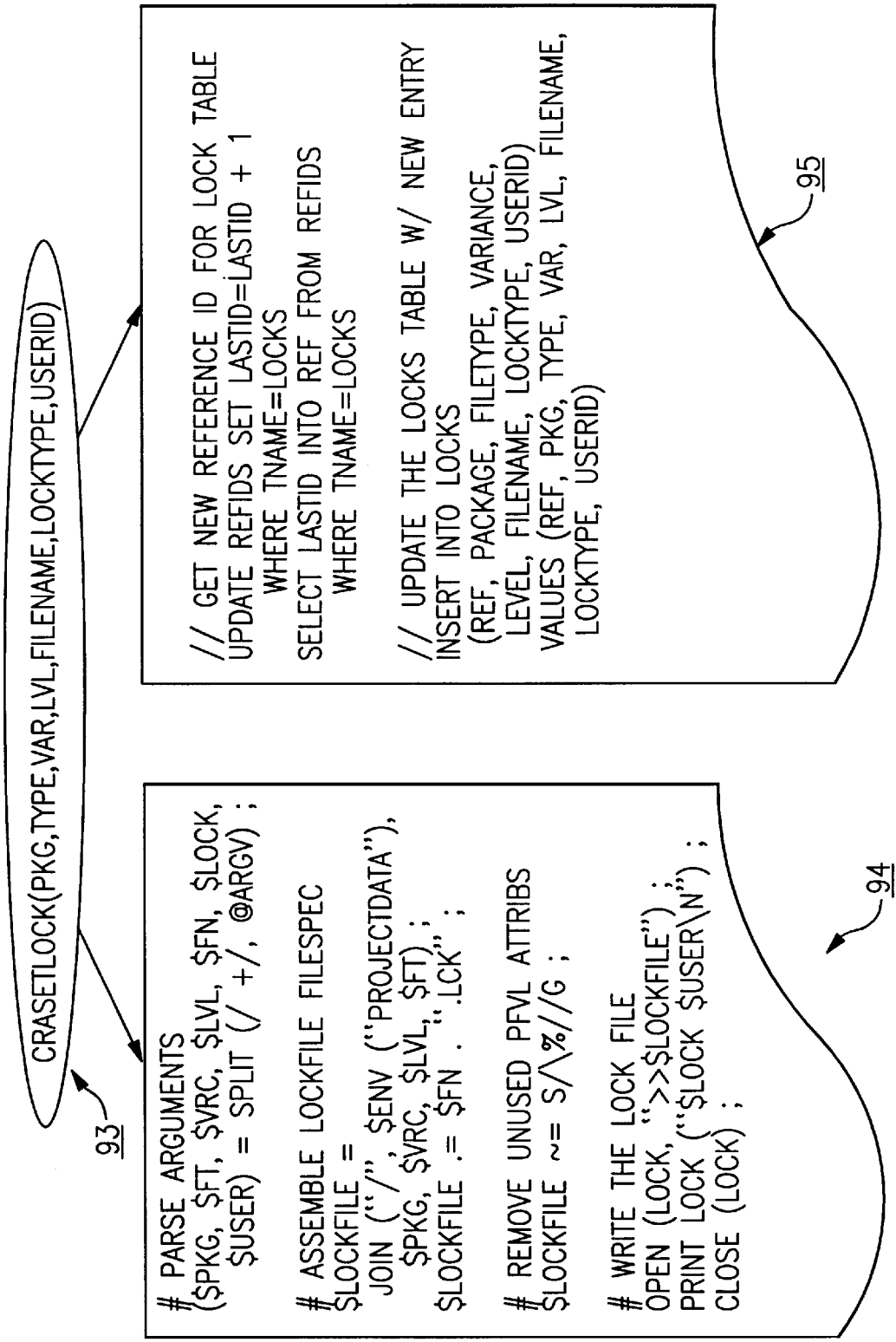

Continuing with the figures, FIG. 9B depicts an example Control Repository Access transaction (93). The syntax of the transaction is purely arbitrary and can be chosen to accommodate the environment. The Perl code Command Translator (94) on the left side of FIG. 9B shows how CR Access transaction (93), which treats the information as if it's located in rows and fields of a table, is translated into the file I/O routines necessary to manifest the physical embodiment depicted in the PFVL-based directory structure (92) of FIG. 9A. Although this represents a simple subset of a realistic Command Translator, it illustrates the four minimum steps required to accomplish the task. First the arguments are parsed according to their position in the entry argument list. Second, the PFVL portion of the argument list is used to construct the path down to the file being locked. The third step takes into account the possibility that a PFVL attribute (such as the Variance) may be absent in the physical embodiment of the DMS. As stated earlier in this disclosure, absence of a PFVL attribute is denoted with a key character such as "%". In the event a "%" is passed in it means the directory corresponding to that PFVL attribute is missing. Finally, the fourth step writes the .LCK file containing the type of lock and identity of the owner. One skilled in the art can see how the example Perl code could be easily implemented in virtually any programming language such as C, Java, Basic, Rexx, Pascal, etc. It should be noted that a Perl example was selected for purposes of providing a simple and straight forward illustration of the present invention. One skilled in the art could appreciate how this sample perl code can be replaced with code to communicate with an API such as one found in a typical Directory Service such as LDAP or Active Directory.

One of the key advantages of the present invention is the ability to easily replace the physical embodiment of the Lock table shown in the PFVL-based directory structure (92) with a more centralized physical embodiment such as the traditional database server (91) managing the Authority table. This is accomplished by simply replacing the Perl Command Translator (93) with the appropriate database translator such as the SQL Translator (95) shown on the right side of FIG. 9B. In this example, the SQL Translator (95) performs the same function as the Perl Translator (93) by using three steps. The first two are combined into an atomic database operation which updates the reference ID of the Lock Table by incrementing the last known reference ID and returning the newly incremented value into the ref variable. The third SQL statement uses this ref variable to insert the PFVL, owner and lock type information into the newly created row of the table.

Notice how the same CR Access transaction (93) is used, but the underlying actions are entirely different. Rather than performing file system operations, the new command translator must perform traditional database table modifications. Although this may be a radical alteration to the command translator, it is completely hidden from the CR Access transaction and any DMS application which uses the craSetLock function. It is this manner by which our invention permits a low-end simplistic data management system such as that shown in the right side of FIG. 9A to grow into a more sophisticated high-end system. In addition it provides a means of replacing one physical embodiment of a Control Repository with another embodiment that may be very similar or completely different, without impact to the end users. This is a strategic advantage in a business environment where mergers and consolidations require constant modifications to their computer and information systems.

As previously stated, the syntax of the example Control Repository Access transaction (93) is purely arbitrary. Our invention does not dictate the format of the Control Repository Access functions, it merely requires that the syntax allow for inclusion of any and all PFVL attributes necessary to define a data object, along with any additional information pertinent to the corresponding virtual Control Repository table. In this particular example:

craSetLock(Pkg,Type,Var,Lvl,FileName,LockType, Userid)

the syntax resembles a typical subroutine or function call where the information is passed as a series of arguments or parameters where the order of the parameters is determined in advance. One should note that this same transaction could use any other imaginable syntax including but not limited to the following examples:

craSetLock(Package=Pkg, FileType=Type, Variance=Var, Level=Lvl,FileName=FileName, LockType=LockType,Owner=Userid)

craSetLock(?Package Pkg ?FileType Type ?Variance Var ?Level Lvl ?FileName FileName ?LockType LockType ?Owner Userid)

craSetLock->Package->FileType->Variance->Level->FileName-> LockType->Owner=(Pkg Type Var Lvl FileName LockType Userid)

SELECT(Lock, Pkg, Type, Var, Lvl, FileName, LockType, Userid)

The present invention affords the opportunity to select the syntax of the Control Repository Access transactions to best accommodate the implementation of the DMS. For example, a DMS which is predominantly implemented as SQL databases would likely choose a different syntax from a DMS largely constructed out of C code. Furthermore, our invention doesn't mandate that all Control Repository Access transactions follow the same syntax. Although the preferred embodiment demonstrates the advantages of using a single syntax to create a uniformity and consistency across the entire DMS, our invention recognizes where there may be circumstances that warrant use of a plurality of syntaxes for different groups of CR access functions.

For instance, consider the case where the virtual Control Repository is comprised of three physical repositories such that some of the information is stored in a relational database, some of it is organized as simple ASCII files in a file system and the remainder resides on a web server. If the situation is such that the environment is unlikely to change, our invention permits the administrator to have three sets of CR access transactions. The first could use a "SQL-like" syntax, the second a simple parameterized list, and the third might use Extensive Markup Language (XML). The disadvantage to this approach is it requires the DMS application developers to use a multitude of CR access syntaxes. However, this may not be a major concern if the DMS applications tend to access data only within a particular physical Control Repository. On the other hand a considerable performance advantage may be obtained by simplifying the Command Translation code. As previously stated, the present invention simply requires that whatever syntax is used permits any and all PFVL attributes to be expressed.

Alternate Embodiment

Another useful application of the present invention pertains to managing data solely within an LDAP structure. The IBM-led Directory Interoperability Forum (D.I.F.) is currently defining standards that would facilitate application development in LDAP directories. Once again, the PFVL paradigm can be applied to create an LDAP structure that further subdivides a business organizational units directories into Package, Level, Variance, and Type directories where the application components would reside. A development level could exist where application development can occur and system integration testing can be performed. Once the testing is complete, the Configuration Manager described in the S.O.M.A. architecture, can be used to promote all of the components that comprise the application to the production level. There are two distinct advantages to assimilating the PFVL paradigm and the S.O.M.A. architecture with the D.I.F. sponsored LDAP structures. First, since these structures are designed to work with heterogeneous networks, the development level could physically reside on one type of platform (i.e. a local network where the application developers reside) while the production level could reside on another platform such as a large Internet server. The second advantage is that LDAP contains facilities to perform directory synchronization. This can be very useful if the need exists to replicate data or applications across many physical repositories. Our invention offers improvements in this area since these replication policies can be encompassed in Library Processes. In this manner, a promote of applications from the development to the production level could initiate a Library Process to perform a replication or synchronization of any required data. In addition, the S.O.M.A. architecture comprises a Library Manager which contains DM applications to perform checkout and checkin operations. This is a critical component for proper management of data in a large enterprise, especially if a multitude of "read-only" copies of the data exist in a distributed fashion. Our invention provides a means for someone who wants to edit an object to perform a checkout and acquire an "out-for-update" lock thus ensuring nobody else can update that same object. Once the users completes the edits, and checks the data in or promotes it to a target directory, an LDAP synchronization process can be initiated to update the "read-only" copies distributed throughout the network.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. Method for use with a data management system having a plurality of repositories of data and a plurality of data managers operating in one or more application layers, comprising the steps of:

providing a directory service for interacting with said data management system having a plurality of repositories of data and a plurality of data managers operating in one or more application layers, storing a plurality of data objects in said directory service and storing other data objects in data repositories of said data management system having a plurality of repositories of data and a plurality of data managers operating in one or more application layers and managing both said data objects and other data objects with a virtual control repository, and, using a single access application at a User Interface Layer of said one or more application layers of the data management system, mapping application transactions to an access method appropriate to a physical implementation of data storage used in said data management system and in said directory service, and in the process of mapping, classifying data objects of said directory service and of said data management system as data objects according to a PFVL Paradign according to Package, Filetype, Variance and Level, so that the PFVL Paradign serves as a common storage model for the storage of data objects both in the separate data storage used in said data management system and in the separate data storage used in said directory service, and managing the data objects residing in separate data storage to enable a directory service to interact with said data management system by:

(a) acting on an initiated request from a client station for data classified according to the PFVL Paradign by determining whether the request should be directed to said directory service or to said data management system, (b) directing the request to the directory service or to said data management system as appropriate from the initiated request, (c) and employing one or more of said plurality of managers for processing the request and if the request is appropriate for the directory service causing at a service server for the directory service the processing of said initated request which was initiated from said client station and causing the return of any resulting data objects meeting the request along with related PFVL data associated with the returned data object to cause the addition, modification, or retrieval of data in the directory service, but (d) if the request is nor appropriate for the directory service, employing one or more of said plurality of managers for processing of said request in a traditional data management system, such as, but not limited to, relational or object oriented databases, meta data, commercially available storage engines or file systems.

2. The method according to claim 1 including the steps of, with a data manager and with a user input provided to said single access application at a User Interface Layer via an API, performing a plurality of processes on data residing in heterogeneous data repositories of said data storage including promotion, check-in, check-out, locking, searching, initiating automated processing, tracking aggregations, and managing releases under management control of a virtual control repository having one or more physical heterogeneous repositories, and storing, accessing, tracking data residing in said one or more data repositories managed by said virtual control repository.

3. The method according to claim 1 wherein data residing in or managed by said directory services is mapped into a Package, Filetype, Variance and Level of said PFVL Paradigm and after mapping within a Variance one or more data objects of a given type are stored at one or more levels.

4. The method according to claim 3 wherein a client initiated query in said directory services uses attributes, object classes, relative domain names, directory entries, or any combination thereof, to map existing directory services functions into the PFVL Paradigm.

5. The method according to claim 3 wherein a single user request initiated using a single access application at a User Interface Layer enables users of directory services to access data and information from either said directory service or from a repository of said data management system which has a traditional database storage, metatdata storage, and file system storage using a common access method.

6. The method according to claim 1 wherein command translators are employed to map generic queries in the form of an initiated request into directory service access calls, traditional database queries, metadata and file system accesses.

7. The method according to claim 3 enabling directory services to be organized by level enabling data for an on-line e-business to be associated with a quality indicator, and promoted through a directory structure as a criteria appropriate for a request is met.

8. The method according to claim 2 wherein the directory services and data management system data managers are configurable and can be dynamically or statically combined as modules of a scalable system without the need to alter any underlying directory services protocol.

9. The method according to claim 2 wherein said User Interface Layer for said single access application provides interaction with said directory services clients via said API, and said mapping into a PFVL paradigm uses tools which can be manipulated by said client and used to access any information governed by the single access application for data objects residing in the directory services and those residing in traditional repositories of said data management system.

10. The method according to claim 2 wherein a data management system application layer contains utilities that a directory service requires to interact with the data management system to process a promotion, check-in, checkout, or lock for a data object, and said utilities are utilized for an initiated request.

11. The method according to claim 1 wherein one or more of data repositories resides completely or partially within the directory service.

12. The method according to claim 2 wherein said single access application uses a scalable client/server interface which permits the data management system to use local services to run in a client-only mode on a directory services client and permitting a combination of local & remote services to run in a distributed client/server mode across a plurality of servers.

13. The method according to claim 2 wherein said single access application employs command translators to map generic virtual control repository transactions into any required command interface needed to interact with the corresponding physical implementation of a virtual control repository.

14. The method according to claim 2 wherein said directory services communicate with said data management system using directory services protocols selected from a group including X.500, LDAP, Active Directory, TCP/IP, token ring, ethernet, and HTTP, or any protocol capable of establishing a connection between a multitude of clients and servers operating in a directory services environment.

15. The method according to claim 2 wherein directory services is coupled to employ said data management system for directory services replication and synchronization functions and to perform library processing for initiating automated replication and synchronization.

* * * * *